United States Patent
Wakimoto et al.

(10) Patent No.: US 6,765,863 B1
(45) Date of Patent: Jul. 20, 2004

(54) NETWORK SYSTEM

(75) Inventors: Takeshi Wakimoto, Osaka (JP); Masahiko Ohashi, Osaka (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 09/712,858

(22) Filed: Nov. 15, 2000

(30) Foreign Application Priority Data

Feb. 28, 2000 (JP) ........................................ 2000-051508

(51) Int. Cl.[7] ............................................. G01R 31/08
(52) U.S. Cl. ....................... 370/218; 370/225; 370/228; 714/2; 714/4; 714/5
(58) Field of Search ................................. 370/216, 217, 370/218, 225, 228; 327/292, 293, 297; 709/208, 238, 242, 248; 714/2, 4, 5, 13, 15

(56) References Cited

U.S. PATENT DOCUMENTS

| | | | | |
|---|---|---|---|---|
| 5,452,115 A | * | 9/1995 | Tomioka | 398/75 |
| 5,577,075 A | * | 11/1996 | Cotton et al. | 375/356 |
| 6,147,971 A | * | 11/2000 | Rochberger et al. | 370/238 |
| 6,205,142 B1 | * | 3/2001 | Vallee | 370/394 |
| 6,414,959 B1 | * | 7/2002 | Asano | 370/395.62 |
| 6,714,563 B1 | * | 3/2004 | Kushi | 370/503 |

FOREIGN PATENT DOCUMENTS

JP  07-038548  7/1995

* cited by examiner

*Primary Examiner*—Wellington Chin
*Assistant Examiner*—Mark A Mais
(74) *Attorney, Agent, or Firm*—Katten Muchin Zavis Rosenman

(57) ABSTRACT

A network system composed of a master network synchronization device and a slave network synchronization device. A master network synchronization device transmits hop count information. A slave network synchronization device receives the hop count information from an adjoining network synchronization device, determines a minimum hop count between the device itself and the master network synchronization device based on the hop count information, transmits the minimum hop count as the hop count information, and extracts a clock from the route from which the minimum hop count is received. Also, each of the network synchronization devices can be provided with the second master network synchronization device besides the first master network synchronization device, so that when a system failure occurs in the first master network synchronization device, the second master network synchronization device which detects the system failure performs the operation of a network synchronization master instead of the first master network synchronization device.

16 Claims, 21 Drawing Sheets

FIG.3A

NETWORK SYNCHRONIZATIN DATA

| MASTER DEVICE NUMBER |
|---|
| HOP COUNT |
| MASTER ORDER |

("FF" : IN CASE OF FAILURE)

("F" : IN CASE OF FAILURE)

FIG.3B

CLOCK DETERMINATION TABLE

| MASTER DEVICE NUMBER |
|---|
| HOP COUNT |
| MASTER ORDER |

("FF" : IN CASE OF FAILURE)

("F" : IN CASE OF FAILURE)

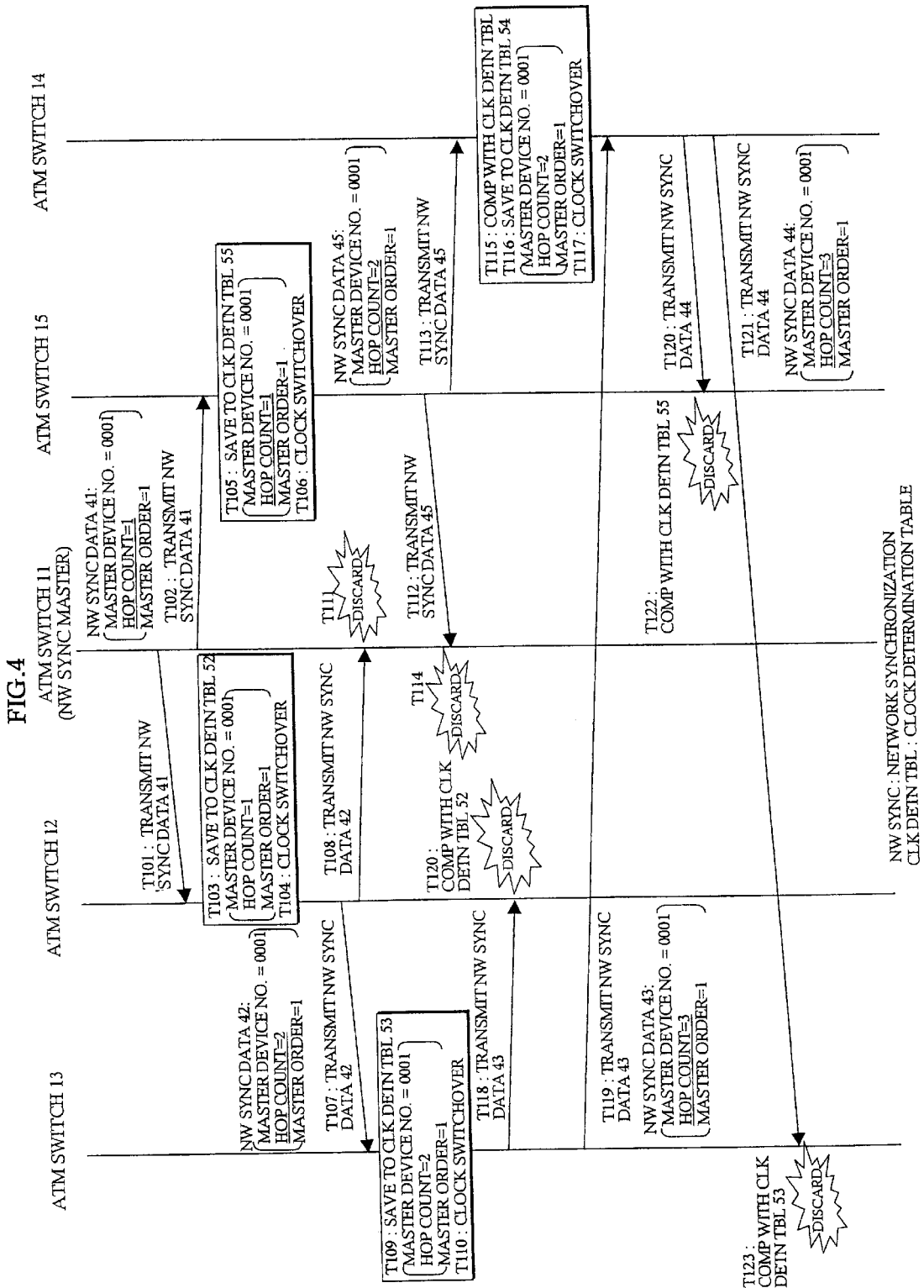

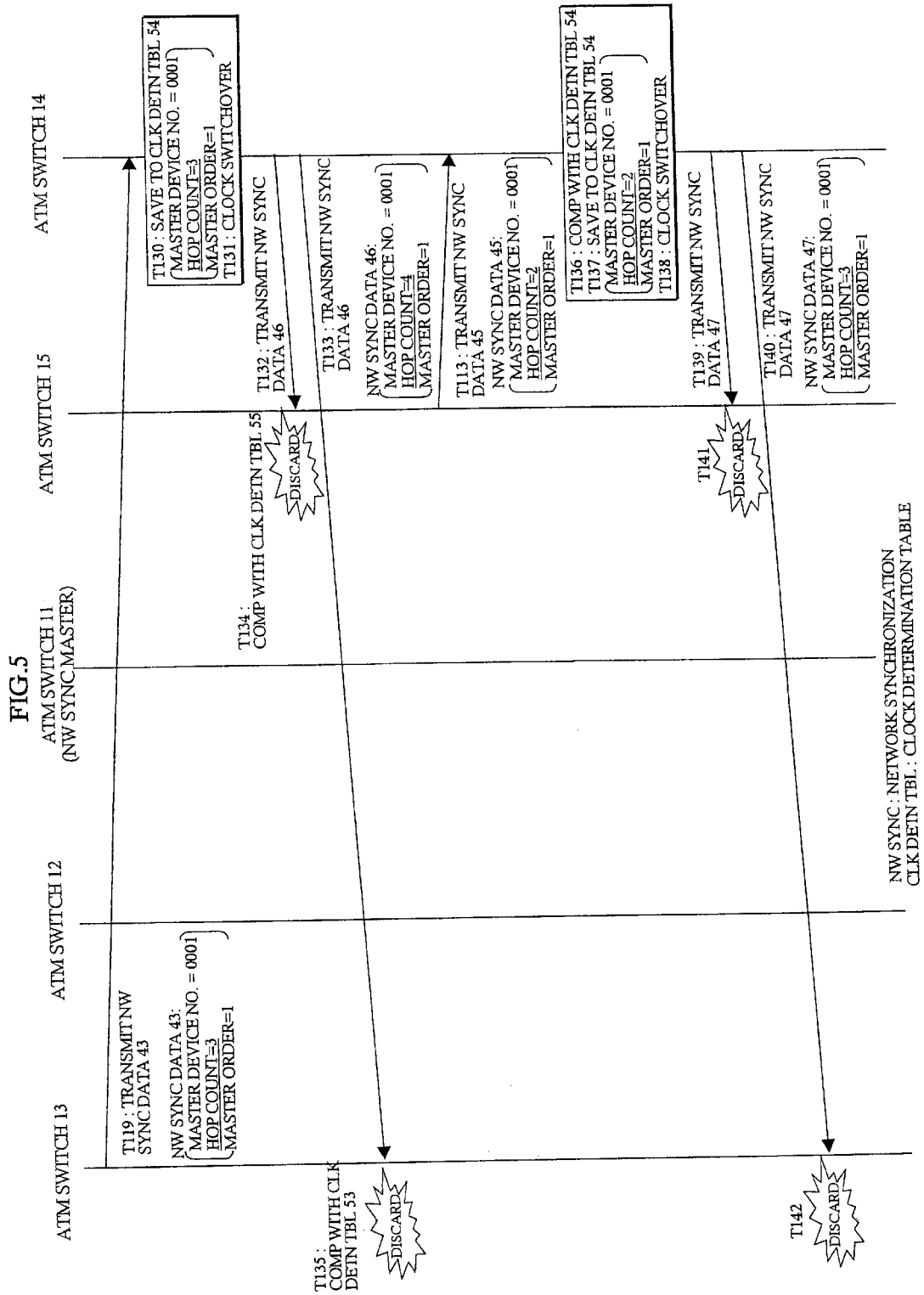

→ : TRANSMISSION
⇢ : RECEPTION
NW SYNC : NETWORK SYNCHRONIZATION

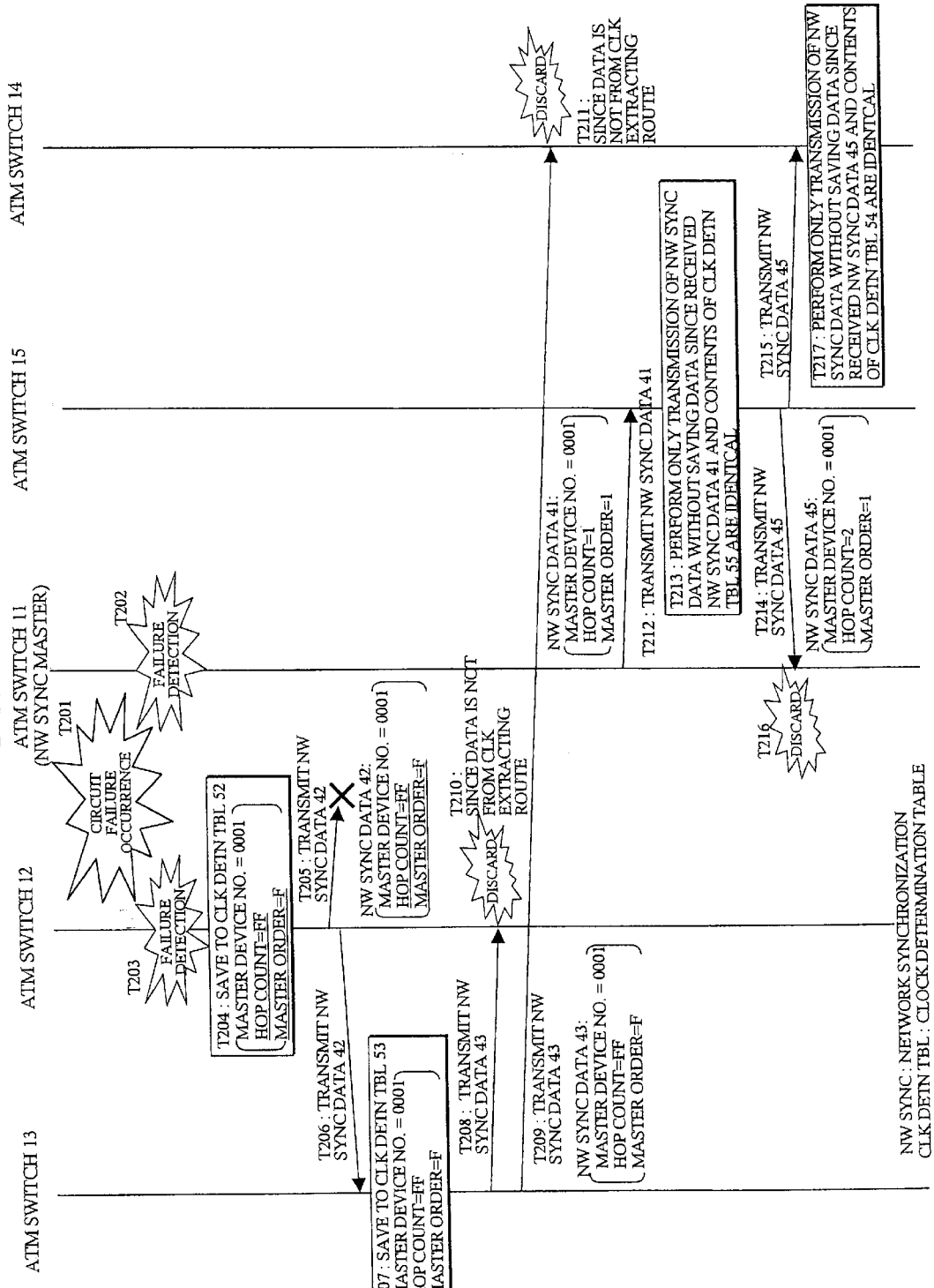

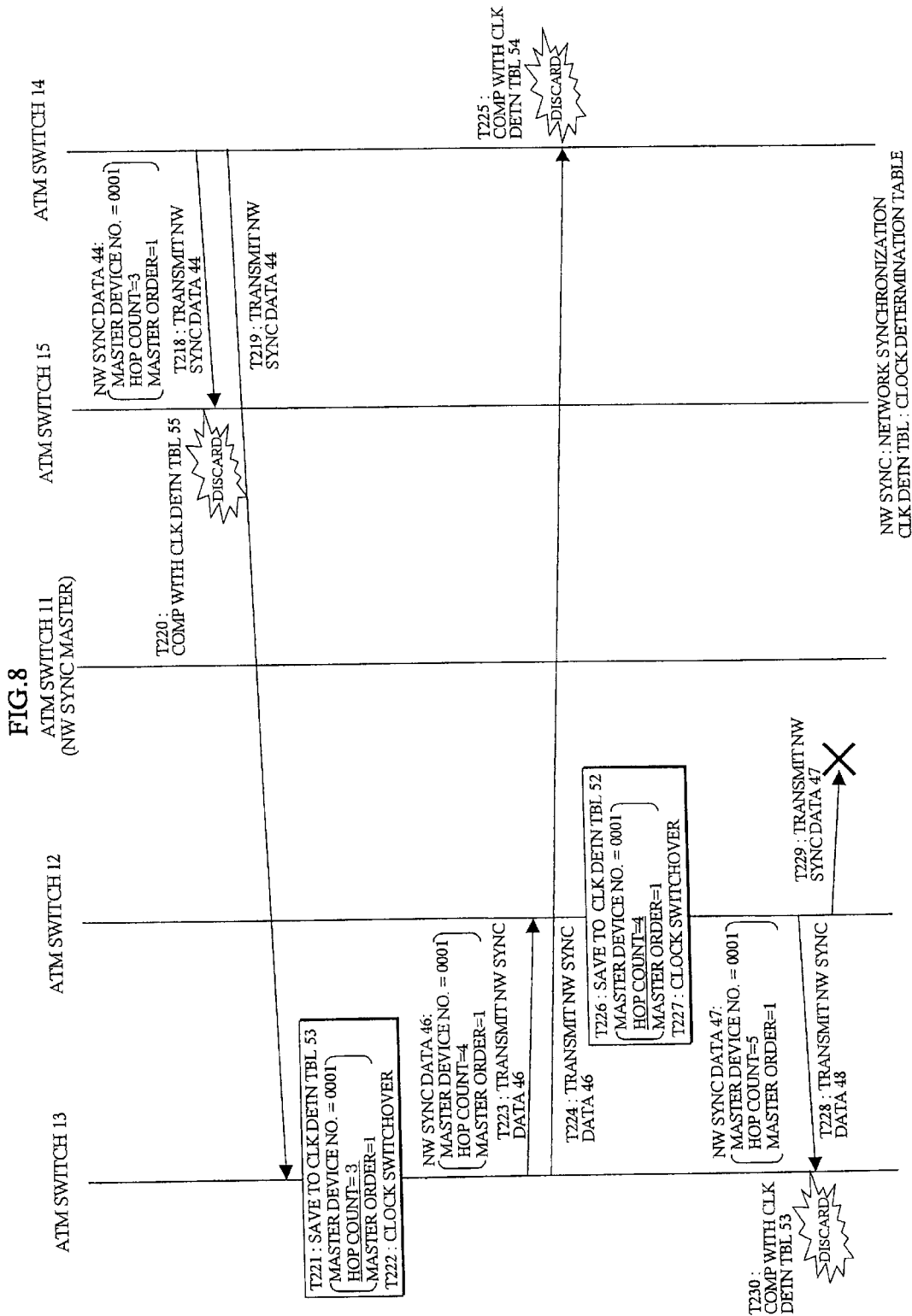

NW SYNC : NETWORK SYNCHRONIZATION

NW SYNC : NETWORK SYNCHRONIZATION
CLK DETN TBL : CLOCK DETERMINATION TABLE

NETWORK SYSTEM

BACKGROUND OF THE INVENTION

1. Field of the Invention

The present invention relates to a network system, and in particular to a network system composed of a master network synchronization device and a slave network synchronization device.

In recent years, a multimedia network system for the communication of a variety of data has been remarkable. Transmitting/receiving devices composing such a multimedia network system, like transmitting/receiving devices composing a conventional network, cannot receive information such as voice data from opposite devices if the devices are not operating at the same clock frequency as the opposite devices. Therefore, it is important to achieve a network synchronization which makes all of the devices composing the network system have a unified clock.

2. Description of the Related Art

FIG. 21 shows an arrangement of a conventional network system in which ATM switches 11–14 are connected in the form of a ring with routes 61–64. Among the ATM switches, the ATM switch 11 is a network synchronization master device, which performs a transmitting/receiving operation based on a clock 31 based on a clock 30 extracted from a signal from a route 60 connected to another network system (not shown), or based on a clock of a clock generator (not shown) of its own, i.e. the ATM switch 11 itself.

If no failure has occurred in any of the routes 61–64, the ATM switches 12–14 respectively extract the clocks 31_1, 32, and 31_2 from the routes 61, 62, and 64, which are first routes, to perform the transmitting/receiving operation in synchronization with the clock 31 of the ATM switch 11. Thus, a network synchronization is established for the entire network system.

Each of the ATM switches 12–14 has a second route set in lieu of the first route in case of a failure occurrence therein.

For example, if a failure occurs in the first route 61 (see timing T11 of FIG. 21), the ATM switch 12 which has detected this failure performs switchover of the clock extracting route (see timing T12 of FIG. 21) in order to extract the clock 33 from the route 62 which is the second route. Since the ATM switch 13 is extracting the clock from the ATM switch 12 at this time, a competition state occurs where the ATM switches 12 and 13 mutually extract their clocks from each other so that the synchronization is disturbed. As a result, the clocks of the ATM switches 12 and 13 run away or drive recklessly (see timings T13 and T14 of FIG. 21).

FIG. 22 shows a case where a failure occurs, not in the route 61 in the network system shown in FIG. 21, but in the ATM switch 11 itself which is the network synchronization master and causes the stoppage of the system (see timing T21 of FIG. 22).

The ATM switches 12 and 14 respectively detect the failure and perform the clock switchover from the clocks 31_1 and 31_2 of the first routes 61 and 64 to the clocks 33_1 and 33_2 of the second routes 62 and 63 (see timings T2 and T23 of FIG. 22).

Thus, the clocks of the ATM switches 12 and 13 run away (see timings T24 and T25 of FIG. 22) as is the case with a failure occurrence in the route 61 shown in FIG. 21 (see timings T13 and T14 of FIG. 21).

Moreover, when the clock of the ATM switch 13 runs away, the clock of the ATM switch 14 which has switched over to the clock of the ATM switch 13 also runs away (see timing T26 of FIG. 22), so that the network synchronization of the entire network system cannot be established.

For example, recent technologies of ATM (Asynchronous Transfer Mode) include a PNNI (Private Network Node Interface) in which two network interface functions called routing and signaling are defined.

Although this PNNI enables the data to be detoured in case a circuit (route) failure occurs, there is a possibility that the communication is interrupted since the clock is not detoured systematically.

Also, such a case where the data communication is interrupted due to the clock not being detoured systematically is not limited to ATM.

In the conventional network system, the above-mentioned problems have been dealt with the methods explained as follows:

(1) In case a failure occurs in the route 61 between the ATM switches 11 and 12 in FIG. 21, a maintenance operator of the ATM switch 12 switches over the route (port) for extracting the clock from the current second route to the third route 66 without problems to extract the clock 36.

At this time, the maintenance operator has to recognize the clock extraction status of not only the ATM switch 12 but also all of the adjoining ATM switches in order to select the port without problems. Therefore, the operation becomes extremely complicated.

(2) In case a failure occurs in the ATM switch 11 which is the network synchronization master in FIG. 22, and the master clock can not be extracted, the maintenance operator of the ATM switch 12 is required to review the clock of the entire network by making the clock of the ATM switch 12 the master clock after changing the clock extracting route to the third route 66, and to change the route from which the clock is extracted if there is an ATM switch requiring the change of the clock extracting route.

Thus, with the conventional methods, the maintenance operator has been greatly burdened when a failure occurs in the circuit or the own device.

SUMMARY OF THE INVENTION

It is an object of the present invention to provide a network system composed of a master network synchronization device and a slave network synchronization device wherein a network synchronization of the entire network system is established by selecting the clock extracting route without requiring a maintenance manual work when a failure occurs in the circuit or the master network synchronization device.

For the achievement of the above object, a master network synchronization device of a network system according to claim 1 of the present invention has clock routing means for repeatedly transmitting hop count information set to a predetermined initial value at a predetermined timing, and the slave network synchronization device has clock routing means for receiving the hop count information from an adjoining network synchronization device and for transmitting a minimum hop count between the slave and the master network synchronization device as the hop count information, a clock determination table for determining the minimum hop count between the slave and the master network synchronization device based on the received hop count information and for saving the minimum hop count and a route from which the minimum hop count is received as a clock extracting route, and a clock extractor for extracting a clock from the clock extracting route.

Namely, the network system is composed of the master network synchronization device and the slave network synchronization device, the network synchronization devices mutually transmitting the hop count information to adjoining network synchronization devices.

Therefore, this hop count information increases every time it is relayed by the network synchronization device.

The clock routing means of the master network synchronization device transmit the hop count information set to the initial value to the adjoining slave network synchronization device, for example, periodically.

The clock routing means of the slave network synchronization device provide the clock determination table with the received hop count information. The clock determination table sequentially determines the minimum hop count between its own device and the master network synchronization device from the received hop count information, and saves the minimum hop count and the route from which the minimum hop count is received as the clock extracting route.

The clock extractor extracts the clock from the signal on the clock extracting route saved to the clock determination table to establish the network synchronization.

Thus, the routes are systematically formed for sequentially transmitting the master clock from the slave network synchronization device nearer to the master network synchronization device (having smaller hop count) toward the slave network synchronization device farther from (having larger hop count) the master network synchronization device by taking the clock of the master network synchronization device as the master clock, so that no competition of the clocks occurs where the two network synchronization devices mutually extract their clocks from each other.

Also, in the network system according to claim 2, the slave network synchronization device in the above present invention may have a circuit failure detector for detecting a circuit failure, and the clock routing means of the slave network synchronization device may transmit failure occurrence information when a circuit failure on the clock extracting route is detected by the circuit failure detector or when the failure occurrence information indicating an occurrence of the circuit failure is received, and the clock determination table may save the failure occurrence information and, upon receiving the hop count information thereafter, update the hop count information and the route from which the hop count information is received as the minimum hop count and the clock extracting route, respectively.

Namely, the slave network synchronization device has a circuit failure detector for detecting a circuit failure. When the circuit failure detector detects the circuit failure in the clock extracting route, the clock routing means transmit the failure occurrence information indicating the occurrence of the circuit failure to the adjoining slave network synchronization device, and the clock determination table saves the failure occurrence information, thereby recognizing that its own device is not in the network synchronization state.

Moreover, the slave network synchronization device which has received the failure occurrence information transmits the failure occurrence information to the adjoining slave network synchronization device.

When the clock routing means of each of the slave network synchronization devices receive the hop count information thereafter, the clock determination table updates the received hop count information and the route from which the information is received as the minimum hop count and the clock extracting route, respectively, thereby recognizing that its own device is in the network synchronization state.

Thus, the clock extracting route excluding the route in which the circuit failure has occurred is systematically formed.

Namely, the clock determination table of each of the slave network synchronization devices updates the minimum hop count and the clock extracting route based on the received hop count information, so that the shortest detour of the clock extracting route excluding the route in which the failure has occurred is determined, thereby making the clock extractor extract the clock through the this detour clock route.

Moreover, if the route recovers from the failure, the hop count information through the recovered route is received by the adjoining network synchronization device. Since this route was originally the route with the minimum hop count, the clock extracting route is returned to the recovered route as in the case of claim 1.

Namely, it becomes possible to systematically switch over the clock extracting route upon the failure occurrence and the recovery therefrom.

Also, in the network system according to claim 3 of the present invention, the clock routing means in the above present invention of claim 1 may transmit the hop count information including metrics of the route.

Namely, the clock routing means make, quality and the like of the route (circuit) to which the hop count information is transmitted, the metrics, and transmit the hop count information including the metrics.

Thus, the clock extracting route formed systematically between the network synchronization devices can be made the route in which the quality and the like of the route transmitted therethrough are taken into account.

Also, in the network system according to claim 4 of the present invention, the clock determination table in the above present invention of claim 1 may determine the clock extracting route based on preset priorities when a plurality of routes having the minimum hop count exist.

Namely, when there are a plurality of routes having the minimum hop count, the clock determination table determines the clock extracting route therefrom based on the preset priorities. This enables the route with, for example, a higher reliability to be extracted as the clock extracting route.

Also, in the network system according to claim 5 of the present invention, the clock routing means of the slave network synchronization device in the above present invention of claim 2 may transmit the failure occurrence information as the hop count information, and the clock determination table may save the failure occurrence information as the minimum hop count and change the failure occurrence information to the hop count information received thereafter.

Thus, it becomes possible to include the failure occurrence information in the hop count information to make a single piece of hop count information, thereby simplifying the operation flow and deleting the information amount of transmission and reception.

Also, in the network system according to claim 6 of the present invention, the clock routing means in the above present invention of claim 1 may include an interface installing a routing protocol and a routing table, and the clock determination table may determine the minimum hop count and the clock extracting route based on metrics of the routing table.

Namely, the clock routing means of each of the network synchronization device may be composed of the interface installing a well-known routing protocol, such as the RIP (Routing Information Protocol) and the OSPF (Open Shortest Route First), and the routing table. In this case, the clock determination table determines the minimum hop count based on the hop count (relayed stage number) calculated from the metrics or the like included in the routing table, and makes the route from which the minimum hop count is received the clock extracting route.

Thus, it becomes possible to use the existing interface as the clock routing means in the network system composed of the device installing the interface of the well-known routing protocol, so that it becomes possible to simplify the arrangement of the device and lower the cost thereof.

Also, in the network system according to claim 7 of the present invention, when the master network synchronization device in the above present invention of claim 2 is made a first master network synchronization device, another network synchronization device may be made a second master network synchronization device, and when a system failure occurs in the first master network synchronization device, the second master network synchronization device may transmit the hop count information set to a predetermined initial value instead of the first master network synchronization device.

Namely, for the preparation of the case a failure occurs in the first master network synchronization device, the second master network synchronization device is preset as a substitute thereof.

When the system failure occurs in the first master network synchronization device, the clock routing means of the second master network synchronization device which has detected the system failure transmit the initialized hop count information to the adjoining slave network synchronization device.

Based on this hop count information, with the same operation as claim 1 of the present invention, the minimum hop count of the clock and the clock extracting route are set in the clock determination table of each slave network synchronization device.

Thus, the clock extracting route with the second master network synchronization device being made the master network synchronization device is systematically formed, so that a clock synchronized network is established.

It is to be noted that also in the network system which has the second master network synchronization device set, the circuit failure is detected and the detour of the clock is systematically established by the same operation as claim 2 of the present invention when the circuit failure occurs.

This can be applied to the case the second master network synchronization device is operating either as the network synchronization master or slave.

Also, in the network system according to claim 8 of the present invention, the clock routing means of the second master network synchronization device in the above present invention of claim 7 may detect the occurrence of the system failure by unreceiving subsequent hop count information before a predetermined time or more elapses after receiving the hop count information.

Namely, the first master network synchronization device, for example, periodically transmits the initialized hop count information. This hop count information reaches the second master network synchronization device directly or through the slave network synchronization device(s).

If the system failure occurs in the first master network synchronization device, the transmission of the hop count information is stopped. Accordingly, it becomes possible for the second master network synchronization device to detect unreceiving the subsequent hop count information before the predetermined time or more elapses after receiving the hop count information as the system failure.

Also, in the network system according to claim 9 of the present invention, each of the network synchronization devices in the above present invention of claim 7 may mount thereon an interface of a routing protocol which manages dynamic topology update information of a network, and the second master network synchronization device may recognize the system failure of the first master network synchronization device with the routing protocol.

Namely, each of the network synchronization devices mounts the interface of the routing protocol which manages the dynamic topology update information of the network system.

Normally, the interface of the first master network synchronization device, periodically transmits the topology update information with the routing protocol. The second master network synchronization device receives this topology update information directly or through another slave network synchronization device and recognizes that the system failure has not occurred in the first master network synchronization device.

If the system failure occurs, since the topology update information of the first master network synchronization device does not reach the destination, the second master network synchronization device recognizes the system failure of the first master network synchronization device and transmits the hop count information set to the predetermined initial value instead of the first master network synchronization device.

Also, in the network system according to claim 10 of the present invention, the slave network synchronization device in the above present invention of claim 9 may recognize the system failure of the first master network synchronization device with the routing protocol.

Namely, in the same way as the second master network synchronization device, the slave network synchronization device detects the system failure of the first master network synchronization device with the routing protocol, and recognizes itself as being not synchronizing with the network synchronization master clock.

Thus, the clock determination table can determine the minimum hop count based on the hop count information received thereafter to establish the network synchronization.

Also, in the network system according to claim 11 of the present invention, upon recognizing the system failure of the first master network synchronization device, the second master network synchronization device in the above present invention of claim 7 may establish the network synchronization with a clock extracted from a clock of a free-running clock generator in the device itself or a clock extracted from a predetermined route connected to a network system other than the network system to which the device itself belongs.

Thus, the second master network synchronization device is to use the clock independent of another network synchronization device in the network, so that the competition of the master clocks in the network is eliminated.

Also, in the network system according to claim 12 or 13 of the present invention, the clock extractor of each slave network synchronization device in the above present invention of claim 2 or 7 may perform only the communication for a specific route in synchronization with a clock from a specific route when the failure occurrence information is held in the clock determination table and communication errors occur on the specific route to which the hop count information is transmitted at a predetermined number of times or more, or at a predetermined time interval or shorter.

Namely, if the failure occurs in the circuit or the network synchronization device, the period, for which the synchronization of the free-running clock of each slave network synchronization device may be missed until the network synchronization is systematically re-established, corresponds to the period for which the failure occurrence information is held in the clock determination table. For this period, a possibility of communication error occurrence is high.

Accordingly, if the communication error occurs repeatedly in the specific route during the period for which the failure occurrence information is held in the clock determination table, the clock extractor performs only the communication between the opposite devices on the specific route until the network synchronization is re-established, in synchronization with the clock extracted from the specific route.

Thus, the communication errors which may occur until the network synchronization is re-established can be decreased.

Also, in the network system according to claim 14 of the present invention, the second master network synchronization device in the above present invention of claim 7 may operate as the slave network synchronization device, and the clock routing means stop transmitting the hop count information set to the initial value upon recognizing that the first master network synchronization device has recovered from the system failure.

Namely, the second master network synchronization device recognizes that the first master network synchronization device itself has recovered from the system failure by receiving, for example, the hop count information of the first master network synchronization device or the topology update information of the routing protocol.

Accordingly, the clock routing means of the second master network synchronization device stop transmitting the hop count information set to the initial value, and transmit the hop count information received from the adjoining network synchronization device including the minimum hop count instead. The clock extractor extracts the clock from the route with the minimum hop count and returns to the operation of the slave network synchronization device.

Thus, it is made possible to restore the master clock of the entire network synchronization from the clock of the second master network synchronization device to that of the first master network synchronization device when the first master network synchronization device has recovered from the system failure.

Also, in the network system according to claim 15 of the present invention, the clock routing means of the master network synchronization device in the above present invention of claim 7 may transmit a master device number and a master order of the device itself, the clock routing means of the slave network synchronization device may relay the master device number and the master order to an adjoining network synchronization device, and the clock determination table may determine the minimum hop count based on the hop count information, the master device number, and the master order. Namely, the first or the second master network synchronization device transmits the master device number and the master order of its own, when recognizing itself as being the master network synchronization device.

The clock routing means of the slave network synchronization device relay the received master device number and the master order to the adjoining network synchronization device. The clock determination table determines the minimum hop count based on the hop count information, the master device number, and the master order.

Thus, it is made possible for the slave network synchronization device to determine the minimum hop count more efficiently by discarding the unnecessary information and the like compared with the case of using the hop count information only.

Also, in the network system according to claim 16 of the present invention, the master network synchronization device in the above present invention of claim 1 may be connected to a route which is connected to another network system which is not included in the network system or to another device, and may extract a master clock from the route.

Thus, the master network synchronization device is made to use the clock independent of another network synchronization device included in the network system according to the present invention, thereby eliminating the competition of the master clocks in the network.

Also, it becomes possible to make the network system according to the present invention a sub-network system of another network system.

Also, the network system according to the present invention is enabled to include another network system. Moreover, it is made possible to connect a plurality of network systems according to the present invention.

BRIEF DESCRIPTION OF THE DRAWINGS

FIG. 3A is a diagram illustrating an example of network synchronization data held by an ATM switch of a network system according to the present invention;

FIG. 3B is a diagram illustrating an example of a clock determination table held by an ATM switch of a network system according to the present invention;

FIG. 4 is a sequence diagram (No. 1) illustrating an example of a hop count determining operation in the embodiment (1) of a network system according to the present invention;

FIG. 5 is a sequence diagram (No. 2) illustrating an example of a hop count determining operation in the embodiment (1) of a network system according to the present invention;

FIG. 7 is a sequence diagram (No. 1) illustrating an example of a hop count determining operation in the embodiment (2) of a network system according to the present invention;

FIG. 8 is a sequence diagram (No. 2) illustrating an example of a hop count determining operation in the embodiment (2) of a network system according to the present invention;

Throughout the figures, the same reference numerals indicate identical or corresponding portions.

DESCRIPTION OF THE EMBODIMENTS

Figure 1A:
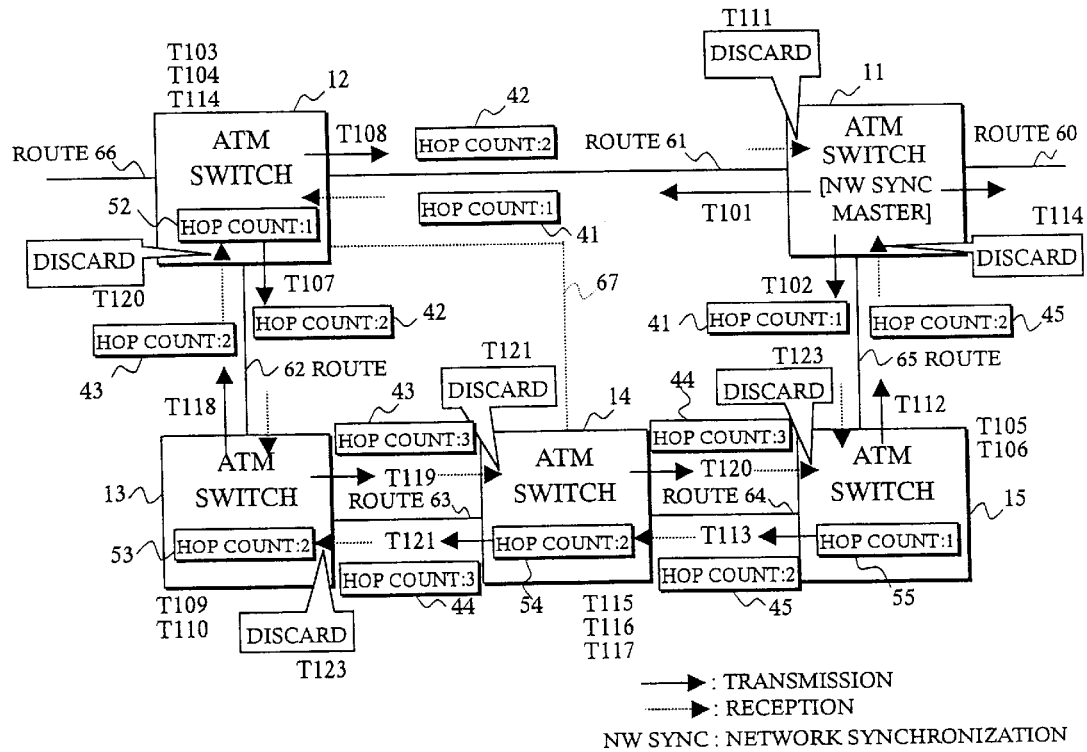
FIGS. 1A and 1B are block diagrams illustrating an embodiment (1) of a network system according to the present invention.

FIG. 1 shows an embodiment (1) of a network system according to the present invention. In this network system, ATM switches 11–15 including network synchronization devices are sequentially connected in the form of a loop with routes 61–65, and the ATM switches 11 and 12 are further connected to other network systems (not shown) with routes 60 and 66, respectively. In this example, the ATM switch 11 is preset as the network synchronization master in the network system and the ATM switches 12–15 are preset as the network synchronization slaves.

The network synchronization master ATM switch 11 operates by using a clock of a clock generator provided internally or externally, or a clock extracted from the route 60 connected to another network system as the master clock.

It is to be noted that although the ATM switches 11–15 are connected loop-like in the network system of the embodiment (1), the topology of the network system according to the present invention may comprise any topology. For example, the ATM switches 12 and 14 may be connected with the route 67 which is shown by a dotted line in FIG. 1A.

Also, if a clock used in a communication with a different network system is prescribed, the network system according to the present invention may comprise a sub network system included in another network system, or may include a sub network system such as an ISDN.

Figure 2:
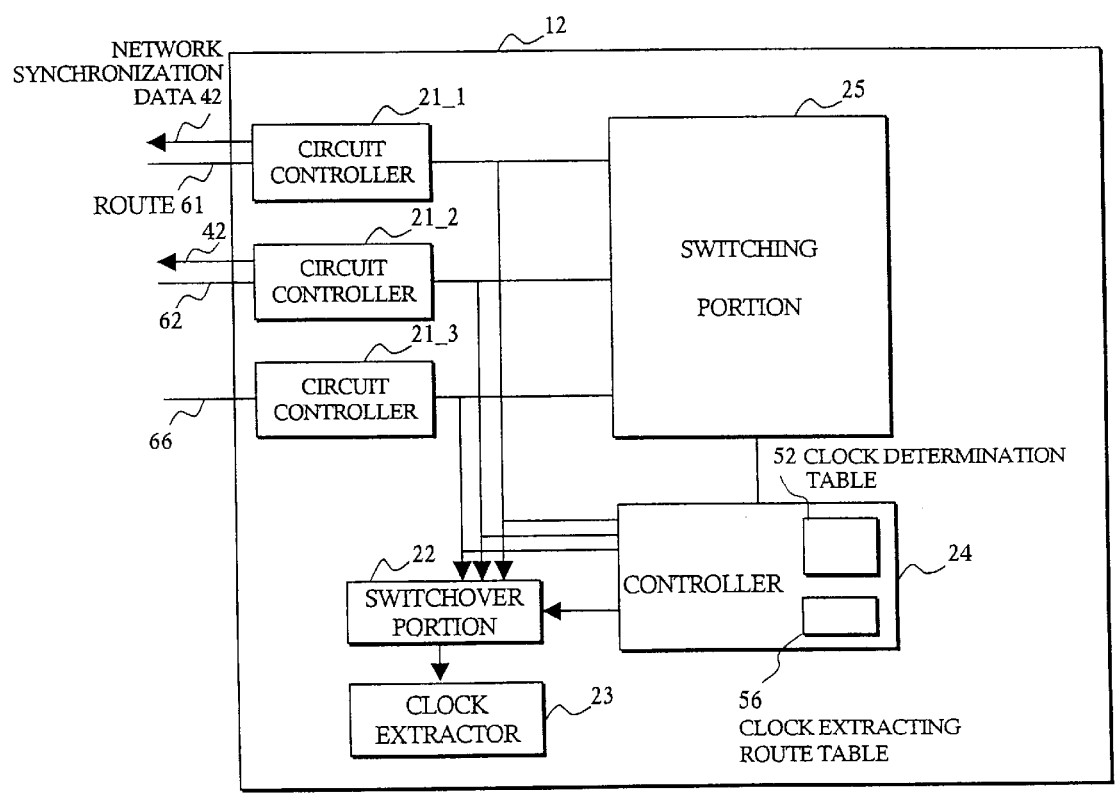
FIG. 2 is a block diagram illustrating an arrangement of ATM switches composing a network system according to the present invention.

FIG. 2 shows an arrangement of the ATM switch 12, which is composed of circuit controllers 21_1–21_3 (hereinafter occasionally referred to by a general reference numeral "21".) respectively connected to the routes 61, 62, and 66, a switchover portion 22, a switching portion 25, and a controller 24 connected to these circuit controllers 21, and a clock extractor 23 connected to the switchover portion 22.

The controller 24 is connected to the switchover portion 22 and the switching portion 25, and includes a clock determination table 52 and a clock extracting route table 56.

Arrangements of the other ATM switches 11, and 13–15 are the same as that of the ATM switch 12 except that the ATM switch 11 is not provided with the clock determination table 52.

FIG. 3A shows network synchronization data (see 41–45 of FIG. 1) mutually exchanged between opposite ATM switches.

The network synchronization data are composed of a "hop count" indicating the minimum number of relaying ATM switches on the route connecting the network synchronization master ATM switch and its own device, and a current "master device number" indicating a switch number set in the network synchronization master as well as a "master order" indicating the priority order of the master ATM switch used as the network synchronization master in case a plurality of network synchronization master ATM switches having priorities are set in embodiments (4) and (5) later described.

FIG. 3B shows clock determination tables 52–55 held by the controller 24 of the ATM switches 12–15 shown in FIG. 2. Formats of the tables 52–55 are the same as those of the network synchronization data 41–45.

It is to be noted that only the hop counts are shown in the network synchronization data 41–45 and the clock determination tables 52–55 shown in FIG. 1.

Also, the clock extracting route table 56 includes the information of a clock route from which the device itself is currently extracting the clock. This clock extracting route information may be included in the clock determination tables 52–55.

FIG. 4 shows an operation sequence example (No. 1) in which each of the ATM switches 12–15 determines the hop count held in the clock determination tables 52–55, respectively.

This operation sequence example will now be described referring to FIGS. 1A, 1B, 2, 3A and 3B.

"FFFF", "FF", and "F" are respectively set to the master device number, the hop count, and the master order of the clock determination table 52 of the ATM switch 12–15 (see FIG. 3B) in the initial state.

Steps T101, T102: In the network synchronization master ATM switch 11, the clock routing means (not shown) in the controller 24 (see FIG. 2) recognizes that its own device is the network synchronization master and transmits the network synchronization data 41 (see FIG. 3A) set to the initial value (the master device number of its own="0001", the hop count="1", and the master order="1") to the ATM switches 12 and 15 through the circuit controllers 21 and routes 61, 65 (see FIG. 1), respectively.

It is to be noted that although the network synchronization data respectively transmitted to the ATM switches 12 and 15 are mutually different, the same reference numeral "41" is used since the data contents are the same. This is the same with the network synchronization data 42–45 later described.

Step T103: The controller 24 of the ATM switch 12 receives the network synchronization data 41 through the circuit controller 21_1, compares the hop count="1" of the network synchronization data 41 with the hop count="FF" of the clock determination table 52, and saves the network synchronization data 41 with a smaller hop count in the clock determination table 52.

As a result, the master device number, the hop count that is the minimum hop count, and the master order of the table 52 respectively assume "0001", "1", and "1".

Also, the clock extracting route table 56 saves the route (hereinafter referred to as the clock extracting route) 61 from which the network synchronization data 41 is received.

It is to be noted that instead of the clock extracting route table 56, the clock determination table 52 may be provided with a clock route field for holding the clock extracting route therein.

Also, descriptions of the comparison operation between the network synchronization data and the clock determination table and of the clock extracting route memorizing operation of the clock extracting route table 56 are hereinafter omitted occasionally. These are the same with the embodiments (2)–(6) later described.

Step T104: The controller 24 provides the switchover portion 22 with a command to extract the clock from the clock extracting route (route 61). The switchover portion 22 performs switchover to a signal inputted through the route 61 and the circuit controller 21_1 to be provided to the clock extractor 23, and the clock extractor 23 extracts the clock from the signal.

Steps T105, T106: In the ATM switch 15, by the same operation as in steps T103 and T105, the master device number, the hop count, and the master order of the clock determination table 55 are respectively set to "0001", "1", and "1", and the clock extractor 23 extracts the clock from the route 65.

Steps T107, T108: The controller 24 of the ATM switch 12 transmits the network synchronization data 42 including the master device number="0001" held in the clock determination table 52, the hop count="2" that is the hop count="1" incremented by "1", and the master order="1" to the routes 61 and 62 through the circuit controllers 21_1 and 21_2, respectively.

It is to be noted that in case the quality of the circuit of the route 61 is worse than that of another route 62, for example, by transmitting the network synchronization data including the hop count="3" in which "2 (=metric)" is added to the route 61, the hop count of the route through route 61 becomes larger so that a possibility for selecting the route 61 as the clock extracting route becomes smaller.

It is to be noted that in this embodiment (1), since the data of the master device number and the master order do not change, the description of the master device number and the master order is hereinafter omitted.

Steps T109, T110: The ATM switch 13 saves the received network synchronization data 42 to the clock determination table 53 and extracts the clock from the signal from the route 62 from which the network synchronization data 42 is received.

Step T111: The ATM switch 11 discards the network synchronization data 42, since recognizing itself as being the network synchronization master.

Steps T112, T113: The ATM switch 15, in the same way as in steps T107 and T108, transmits the network synchronization data 45 including the hop count="2", that is the hop count="1" held in the clock determination table 53 incremented by "1", to the routes 65 and 64.

Step T114: The ATM switch 11 discards the received network synchronization data 45.

Steps T115–T117: The ATM switch 14 saves the network synchronization data 45 to the clock determination table 54. As a result, the hop count of the clock determination table 54 assumes "2".

Steps T118, T119: The ATM switch 13 transmits the network synchronization data 43 including the hop count="3", that is the hop count="2" of the clock determination table 53 incremented by "1", to the routes 62 and 63.

Step T120: The ATM switch 12 compares the received hop count="3" with the hop count="1" of the clock determination table 52, and discards the network synchronization data 44 since the received hop count is larger.

Step T121: The ATM switch 14, in the same way as in step T120, discards the network synchronization data 44.

Steps T122, T123: The ATM switch 14, in the same way as in steps T118 and T119, transmits the network synchronization data 44 including the hop count="3" to the routes 64 and 63.

Steps T124, T125: The ATM switches 15 and 13, respectively perform the comparison similar to step T120 and discard the received network synchronization data 44.

Thus, the clock determination tables 52–55 of the ATM switch 12–15 respectively get "1", "2", and "1" saved to the hop count field.

Figure 1B:
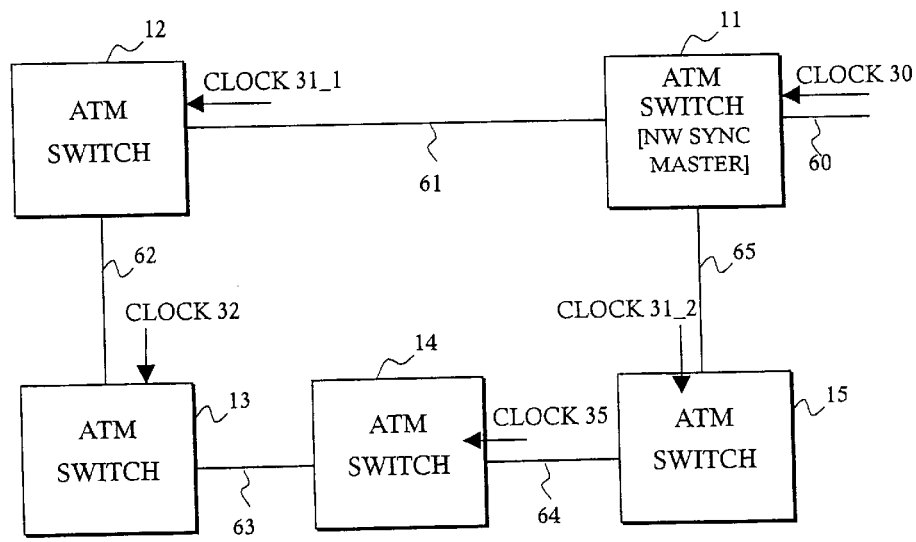

FIG. 1B shows the routes from which each of the ATM switches 12–15 respectively extracts the clock based on the clock extracting route table 56.

Namely, the ATM switches 12–15 respectively extract the clocks 31_1, 32, 35, and 31_2 from the routes 61, 62, 64, and 65 from which the hop counts saved to the clock determination tables 52–55 are received.

FIG. 5 shows a case where the network synchronization data 45 of step T113 has arrived at the ATM switch 14 later than the network synchronization data 43 of step T119 in FIG. 4. This operation will be described herebelow.

Step T119: The ATM switch 13 transmits the network synchronization data 41 to the ATM switch 14.

Steps T130, T131: The clock determination table 54 of the ATM switch 14 saves the received network synchronization data 41, and the clock extracting route table saves the route 63 as the clock extracting route. As a result, the hop count of the table 54 assumes "3" and the clock is extracted from the route 63.

Steps T132–T135: The ATM switch 14 transmits the network synchronization data 46 including the hop count="4" to the ATM switches 13 and 15, respectively, to be discarded by the ATM switches 13 and 15.

Step T113: The ATM switch 14 receives the network synchronization data 45 including the hop count="2" transmitted by the ATM switch 15.

Steps T136–T138: The ATM switch 14 compares the hop count="2" of the network synchronization data 45 with the hop count="3" of the clock determination table 54, saves the network synchronization data including a smaller hop count to the table 54, and switches over the clock extracting route to the route 64.

Steps T139–T142: The ATM switch 14 transmits the network synchronization data 47 including the hop count="3" to the ATM switches 13 and 15, respectively. The ATM switches 13 and 15 discard the network synchronization data 47.

As a result, the hop counts included in the clock determination tables of the ATM switches 12–15 assume "1", "2", "2", and "1", respectively. Also, the clock extracting routes of the ATM switches 12–15 assume the route 61, 62, 64, and 65, respectively. These are the same as the case of FIG. 4.

Namely, when the network synchronization data transmitted from the master ATM switch is relayed by the slave ATM switches through different routes, there is a possibility that the minimum hop counts of the slave ATM switches mutually differ at the initial state. However, the minimum hop counts of the slave ATM switches will finally converge to the minimum hop count arriving at each slave ATM switch with making the master ATM switch the starting point.

Figure 6A:
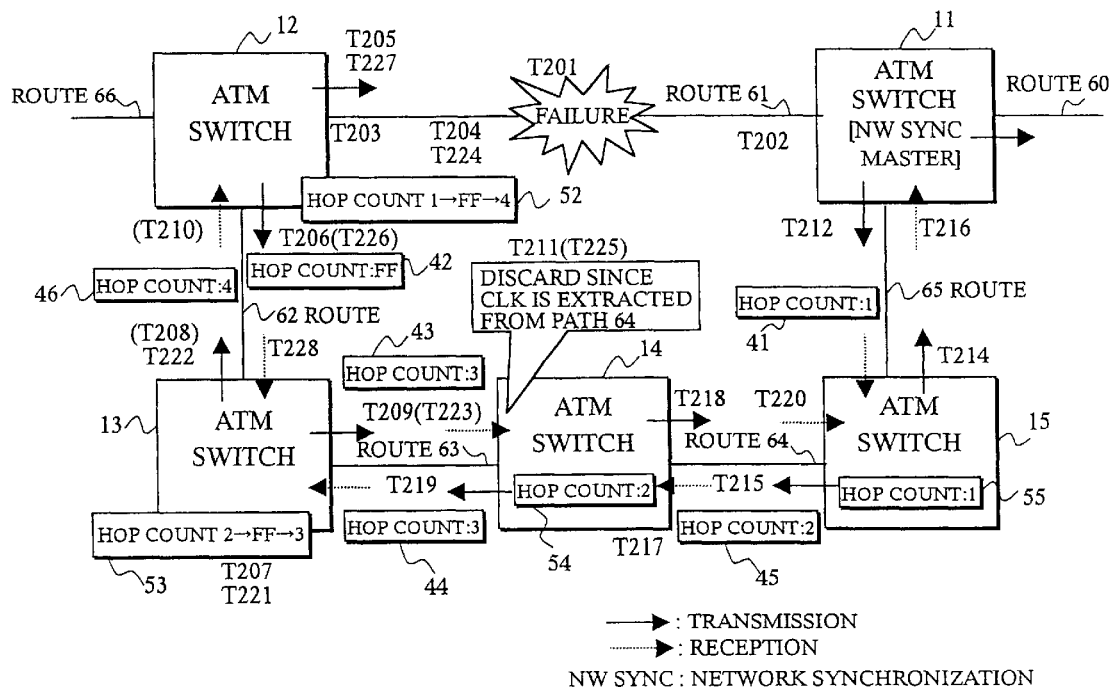
FIGS. 6A and 6B are block diagrams illustrating an embodiment (2) of a network system according to the present invention.
Figure 6B:
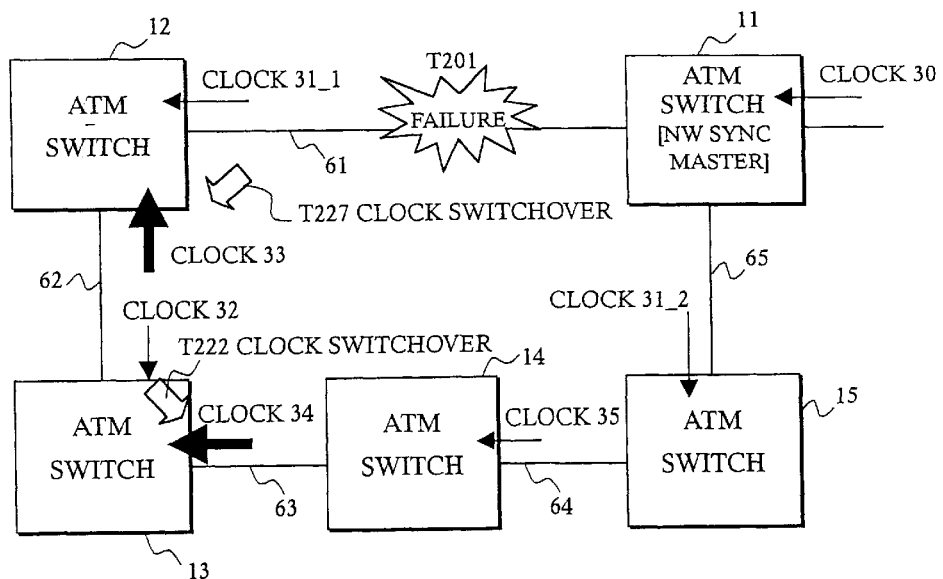

FIGS. 6A and 6B show an embodiment (2) of the present invention. This embodiment (2) shows a case where a failure occurs in the route 61 which mutually connects the ATM switches 11 and 12 in the network system shown in the embodiment (1).

FIGS. 7 and 8 show examples of operation sequences (Nos.1 and 2) how the ATM switches 12–15 determine the hop count (i.e. the clock extracting route) held in the clock determination tables 52–55, respectively.

The example of the operation sequence will be described herebelow referring to FIG. 6A.

Step T201: A failure occurs in the route 61.

Step T202: The ATM switch 11 detects the failure.

Steps T203, T204: The ATM switch 12 detects the failure in the clock extracting route, changes the hop count to "FF" and the master order to "F" in the clock determination table 52, and perform using a free-running clock of its own without performing the clock extraction from the route 61.

Steps T205, T206: The ATM switch 12 transmits the network synchronization data 42 including the master device number="0001", the hop count="FF", and the master order="F" to the ATM switches 11 and 13 through the routes 61 and 62, respectively, and indicates that the clock included in the signal transmitted by itself is not synchronizing with the clock of the network synchronization master.

Among these, the network synchronization data 42 of the route 61 do not reach the ATM switch 11 since the failure has occurred in the route 61. It is to be noted that the ATM switch 12 may be made not to transmit the network synchronization data 42 to the route 61 in which the failure has occurred, in which case the result is the same.

Step T207: The ATM switch 13 detects the hop count="FF" of the network synchronization data 42 received from the route 62 (see FIG. 1B) from which the clock is extracted and saves the data value of the network synchronization data 42 to the clock determination table 53.

As a result, the value of the hop count held in the clock determination table 53 of the ATM switch 13 is changed from "2 (see step T109 of FIG. 4)" to "FF", and the value of the master order is changed from "1 (see step T109 of FIG. 4)" to "F".

Namely, when "FF" comes, meaning that a failure has occurred, it is forcibly changed to "FF" without performing a comparison operation.

Thus, the ATM switch 13 recognizes that the clock of its own is not synchronizing with the clock of the master network synchronization device.

Steps T208, T209: The ATM switch 13 transmits the network synchronization data 43 including the same data with the received network synchronization data 42 to the ATM switches 12 and 14 through the route 62 and 63.

Steps T210, T211: The ATM switches 12 and 14 discard the network synchronization data 43 since the network synchronization data 43 including the hop count="FF" are the data respectively received from the routes 62 and 63 which are not the routes from which the clock is extracted.

It is to be noted that the network synchronization data 43 transmitted from the ATM switch 13 to the ATM switch 12 are not shown in FIG. 6. Likewise, hereinafter, discarded network synchronization data will not be occasionally illustrated in FIG. 6.

Step T212: the network synchronization master ATM switch 11 periodically transmits the network synchronization data 41 set to an initial value (the master device number="0001", the hop count="1", and the master order="1") to the route 65.

It is to be noted that the ATM switch 11 may be made to transmit the above-mentioned network synchronization data 41 no sooner than a failure is detected at step T202.

Steps T213–T215: The ATM switch 15 transmits the network synchronization data 45 in which only the hop count in the network synchronization data 41 is changed from "1" to "2" to the routes 65 and 64 without saving the network synchronization data 41 in the table 55 since the contents of the received network synchronization data 41 and that of the clock determination table 55 are the same.

Step T216: The ATM switch 11 discards the received network synchronization data 45, since recognizing itself as being the network synchronization master.

Steps T217–T219: The ATM switch 14, in the same way as in step T213, transmits the network synchronization data 44 in which only the hop count is changed from "2" to "3" to the ATM switches 13 and 14 through the routes 63 and 64 without saving the network synchronization data 45 in the clock determination table 54.

Step T220 The ATM switch 15 discards the network synchronization data 44.

Steps T221, T222: The ATM switch 13 saves the received network synchronization data 44 to the table 55 since the hop count of the clock determination table 53 is "FF". As a result, data values of the hop count and the master order of the table 53 are changed to "3" and "1", respectively, and the clock extracting route of the ATM switch 13 is switched over to the route 63.

Steps T223, T224: The ATM switch 13 transmits the network synchronization data 46, in which only the hop count of the network synchronization data 44 is changed from "3" to "4", to the ATM switches 14 and 12 through the routes 63 and 64.

Step T225: The ATM switch 14, in the same way as in step T220, discards the network synchronization data 46.

Steps T226, T227: The ATM switch 12, in the same way as in step T221, saves the received network synchronization data 46 to the clock determination table 54. As a result, the data values of the hop count and the master order of the clock determination table 52 are respectively changed to "4" and "1" and the clock extracting route is switched over to the route 62.

Steps T228–T230: The ATM switch 12 transmits the network synchronization data 47 (not shown in FIGS. 6A and 6B) which has only the hop count of the network synchronization data 46 changed from "4" to "5" to the ATM switches 13 and 11 through the routes 62 and 61.

The network synchronization data 47 are not transmitted to the ATM switch 11 due to the failure in the route 61 and are discarded by the ATM switch 13 in the same way as in step T220.

FIG. 6B shows the routes from which each of the ATM switches 12–15 extracts the clock based on the clock determination tables 52–55, respectively.

Comparing FIG. 6B with FIG. 1B, the ATM switches 12 and 13 switch over the clock extracting route to the routes 62 and 63, respectively, so that the clocks 33 and 34 are extracted from the routes.

Namely, according to this embodiment (2), a detour (route 65→64→63→62) in which no failure has occurred is systematically routed so that it is made possible for the ATM switches 12 and 13 to extract the clock from the signal through the detour without causing the mutual competition of the clock.

Figure 9:
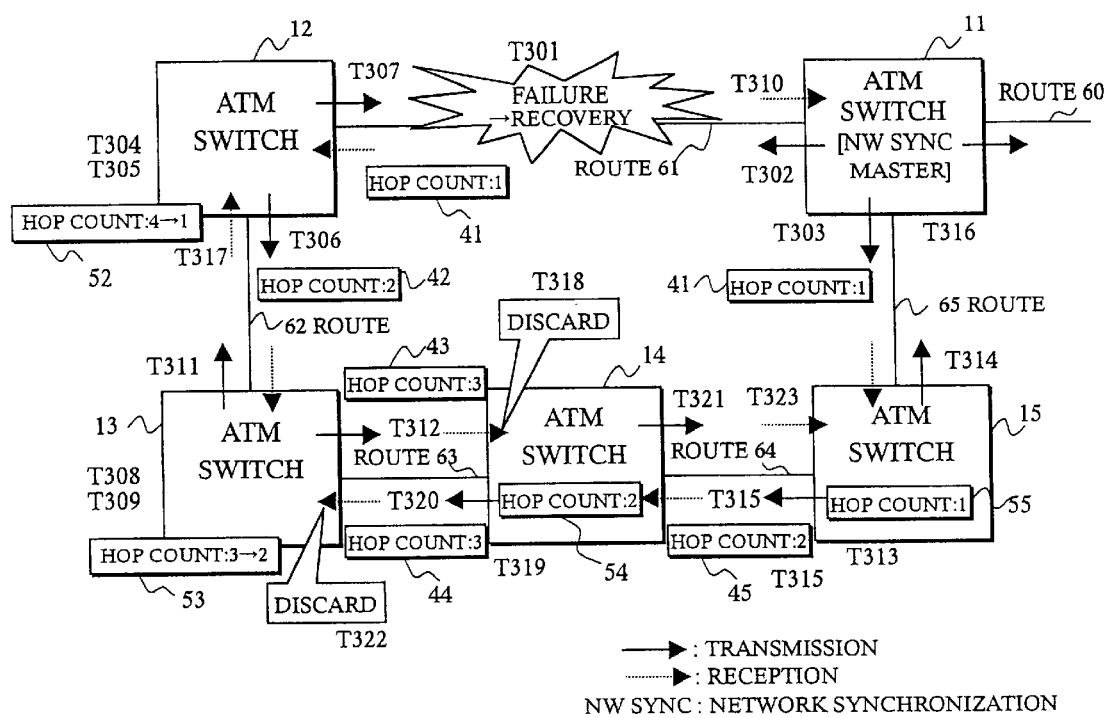
FIG. 9 is a block diagram illustrating an embodiment (3) of a network system according to the present invention.

FIG. 9 shows an embodiment (3) of the present invention, which shows a case where the route 61 of the network system in the embodiment (2) has recovered from the failure occurred therein. The hop counts set in the clock determination tables 52–55 of each of the ATM switches 12–15 at the time of the recovery from the failure are "4" (see step T226 in FIG. 8), "3" (see step T221 in FIG. 8), "2", and "1", respectively.

Figure 10:
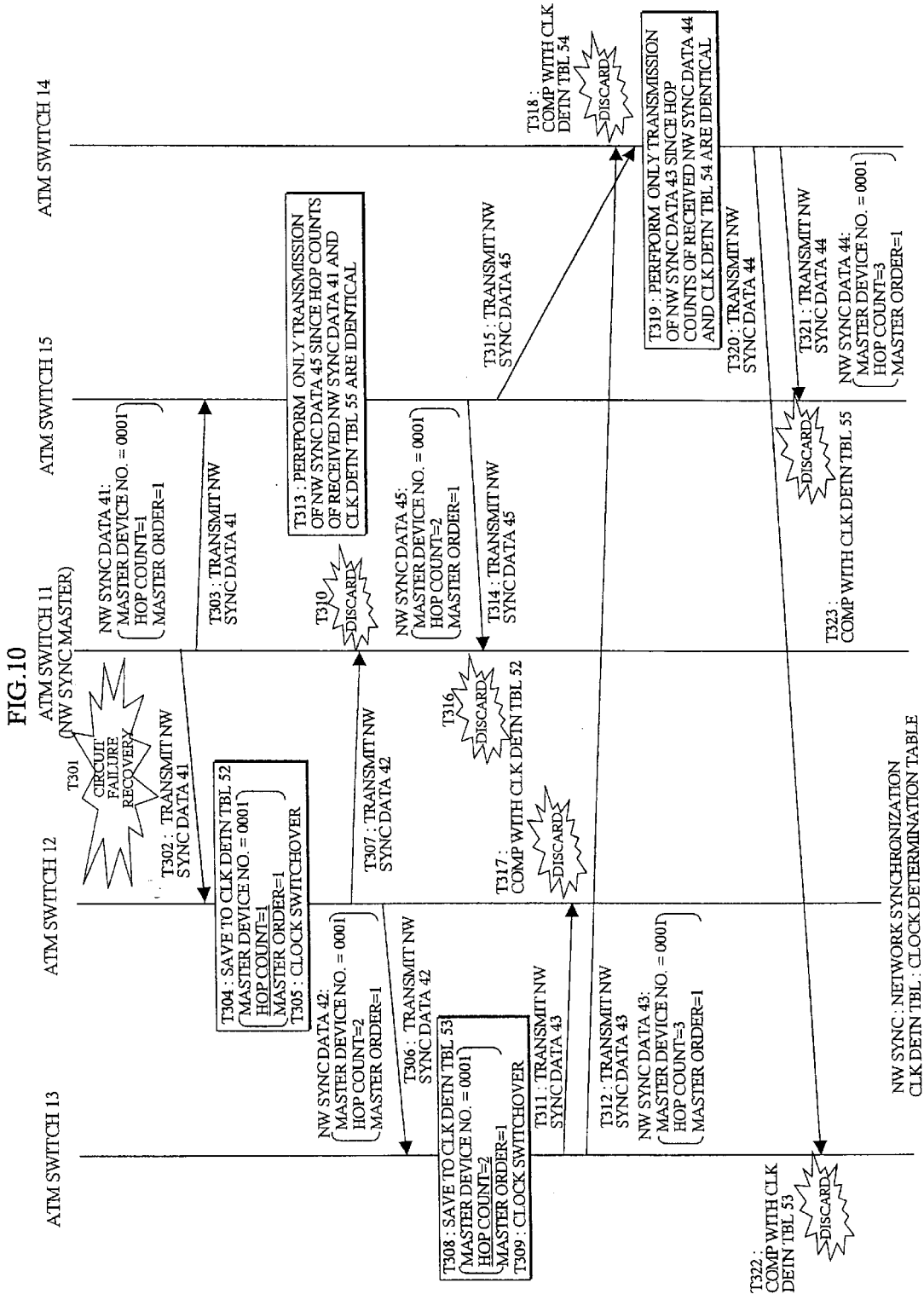
FIG. 10 is a sequence diagram illustrating an example of a hop count determining operation in the embodiment (3) of a network system according to the present invention.

FIG. 10 shows an operation sequence example how the ATM switches 12–15 determine the hop counts respectively held in the clock determination tables 52–55 in case of the recovery from the failure. The operation sequence will be described herebelow referring to FIG. 9.

Step T301: The route 61 recovers from the failure.

Steps T302, T303: The network synchronization master ATM switch 11 periodically transmits the network synchronization data 41, the same as those shown at steps T101 and T102 in the embodiment (1) in FIG. 4 to the routes 61 and 65.

Steps T304, T305: The ATM switch 12 compares the hop count="1" of the received network synchronization data 41 with the hop count="4" of the clock determination table 52 and saves the network synchronization data 41 to the table 52 since the hop count of the network synchronization data 41 is smaller. As a result, the hop count of the table 52 is changed to "1".

Moreover, the ATM switch 12 switches over the clock extracting route from the route 62 to the route 61.

Steps T306, T307: The ATM switch 11 transmits the network synchronization data 42 in which only the hop count of the received network synchronization data 41 is changed to the hop count="2" to the ATM switches 13 and 11.

Steps T308, T309: The ATM switch 13, in the same way as in steps T304 and T305, saves the network synchronization data 42 to the table 53 and switches over the clock extracting route from the route 63 to the route 62.

Step T310: The ATM switch 11 discards the received network synchronization data 42, since recognizing itself as being the network synchronization master.

Steps T311, T312: The ATM switch 13, in the same way as in steps T306 and T307, transmits the network synchronization data 43 including the hop count="3" to the ATM switches 12 and 14.

Steps T313, T314, T315: The ATM switch 15 does not save the network synchronization data 41 to the table 55 since the hop counts of the received network synchronization data 41 and the clock determination table 55 are the same "1", but transmits, in the same way as in steps T306 and T307, the network synchronization data 45 in which only the hop count in the network synchronization data 41 is changed to "2" to the ATM switches 11 and 14, respectively.

It is to be noted that if there are a plurality of routes having the minimum hop count, the clock extracting route may be determined based on preset priorities. This enables, for example, a route with a higher circuit quality to be selected with a higher priority.

Step T316: The ATM switch 11, in the same way as in step T310, discards the received network synchronization data 45.

Steps T317, T318: The ATM switches 12 and 14, respectively compare the hop counts of the received network synchronization data 43 and the clock determination table 54, and discard the network synchronization data 43 since the hop count of the network synchronization data is larger.

Steps T319–T321: The ATM switch 14, in the same way as in step T313, transmits the network synchronization data 44 in which only the hop count of the network synchronization data 45 is changed to "3" to the ATM switches 13 and 15 without saving the received network synchronization data 45 in the clock determination table 54.

Steps T322, T323: In the same way as in steps T311 and T312, the ATM switches 13 and 15 discard the network synchronization data 44.

As a result, the hop counts of the clock determination tables 52 and 53 in the ATM switches 12 and 13 respectively return to the hop count="1" and "2" shown in the embodiment (1) of FIG. 1A. Therefore, the route from which each of the ATM switches 12–15 extracts the clock becomes the same as that in FIG. 1B.

Namely, each of the ATM switches 12–15 is to systematically extract the clock from the shortest route when no failure occurs in the route 61.

It is to be noted that while the case where the ATM switch 14 receives the network synchronization data in the order of the network synchronization data 43 and the network synchronization data 45 has been described in steps T312 and T315, the result is the same even if those data are received in the reversed order.

Figure 11:
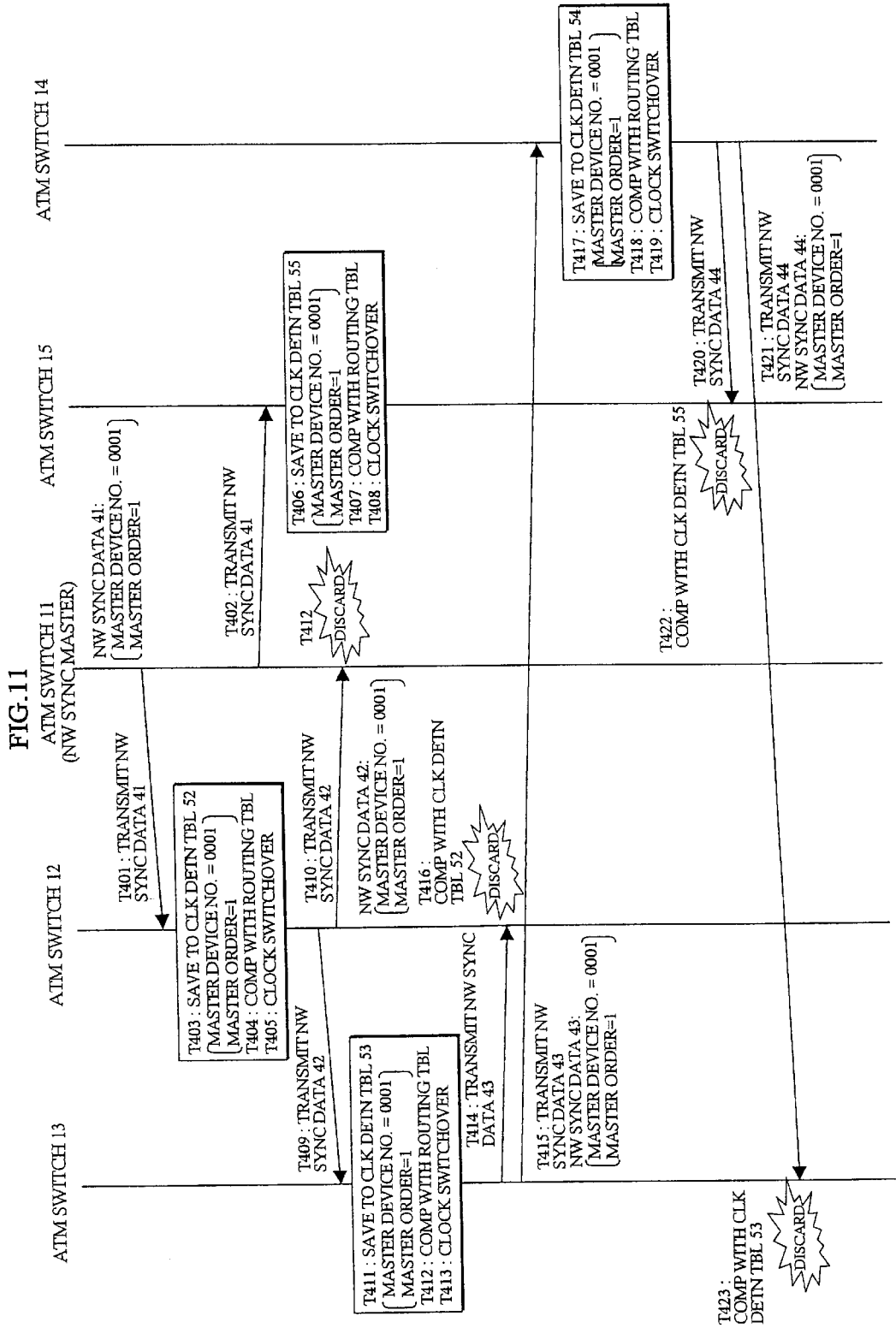
FIG. 11 is a sequence diagram (No. 1) illustrating an example of a hop count determining operation in an embodiment (4) of a network system according to the present invention.
Figure 12:
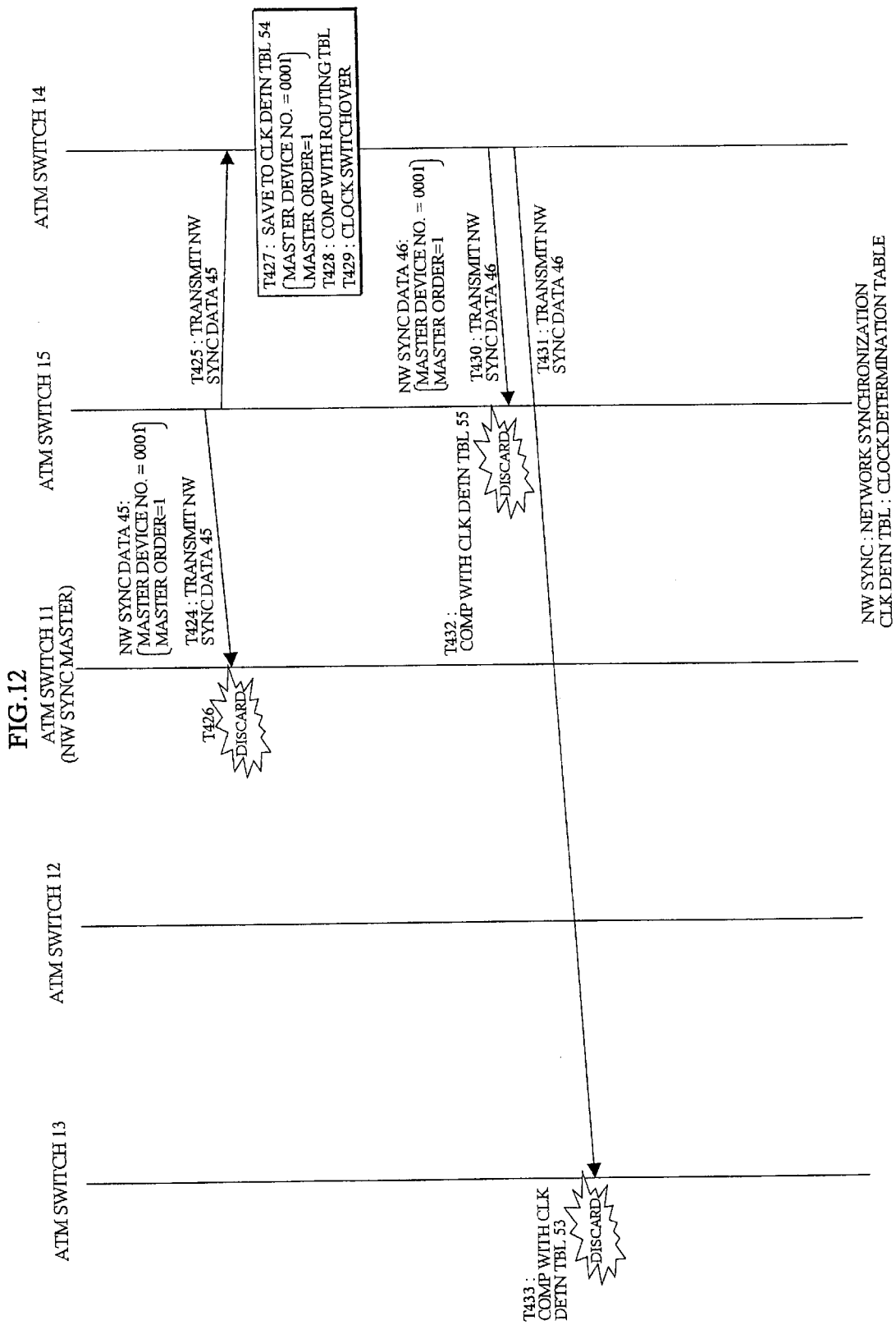
FIG. 12 is a sequence diagram (No. 2) illustrating an example of a hop count determining operation in the embodiment (4) of a network system according to the present invention.

FIGS. 11 and 12 show operation sequence examples (Nos. 1 and 2) of each of the ATM switches 11–15 in an embodiment (4) of the present invention. The arrangement of the network system of this embodiment (4) is the same as that of the network system of the embodiment (1) shown in FIG. 1. However, it is different from the embodiment (1) in that the ATM switches 11–15 mount thereon an interface of a known routing protocol for periodically exchanging routing information (including hop count information), for example, every 30 seconds, and a routing table (not shown) for holding the routing information.

Therefore, unlike the embodiment (1), the network synchronization data and the data of the clock determination table have only the "master device number" and the "master order" but no special "hop count" information.

Also, the ATM switch 11 recognizes itself as being the network synchronization master.

An operation sequence of the ATM switches 12–15 for determining the clock extracting route will be described herebelow referring to FIG. 1.

The master device number and the master order in the initial state are "FFFF" and "F", respectively.

Steps T401, T402: The ATM switch 11 transmits the network synchronization data 41 set to the initial values (the master device number=0001 and the master order=1) to the ATM switches 12 and 15.

Steps T403–T405: The ATM switch 12 compares the master order="1" of the network synchronization data 41 with the master order="F" of the clock determination table 52, and saves the network synchronization data 41 having the lower order to the table 52.

Moreover, the ATM switch 12 refers to the known routing table to determine the route 61 with the minimum or smallest hop count, and performs a clock switchover for making this route 61 the clock extracting route.

Steps T406–T408: The ATM switch 15, in the same way as in steps T403–T405, saves the network synchronization data 41 to the clock determination table 55, and switches over the clock to that of the route 65 with the minimum hop count.

Steps T409–T413: The ATM switch 12 transmits the network synchronization data 42 similar to the network synchronization data 41 to the ATM switches 13 and 11. The ATM switch 11 discards the network synchronization data 42, since recognizing itself as being the network synchronization master.

The ATM switch 13 saves the network synchronization data 42 to the clock determination table 53, determines the route 62 with the minimum hop count from the routing table, and extracts the clock from this route 62.

Steps T414–T419 The ATM switch 13 transmits a synchronization data 43, and the ATM switch 12 refers to the routing table to discard the network synchronization data 43 from the route 62 without having the minimum hop count.

The ATM switch 14, in the same way as in steps T411–T413, saves the network synchronization data 43 to the clock determination table, and refers to the routing table to extract the clock from the route 64 having the minimum hop count.

Steps T420–T423: The ATM switch 14 transmits the network synchronization data 44, and the ATM switches 13 and 15 respectively discard the network synchronization data 44.

Steps T424–T433: In the same way as in steps T414–T423, the ATM switch 15 transmits the network synchronization data 45 to be discarded by the ATM switch 11 and to be saved to the clock determination table 54 by the ATM switch 14 for the switchover of the clock.

Also, the network synchronization data 46 transmitted from the ATM switch 14 are discarded by the ATM switches 13 and 15.

Namely, each of the ATM switches 12–15, respectively refers to the routing table to determine the route having the minimum hop count from itself to the network synchronization master ATM switch 11 to extract the clock from this route, when the master device number="0001" is notified.

Finally, the master device number and the master order of the clock determination tables in the ATM switches 12–15 are commonly set to "0001" and "1", respectively, so that all of the ATM switches 12–15 recognize that the network synchronization master is the ATM switch 11.

It is to be noted that the ATM switches 12–15 may be preset with the master device number of the network synchronization master ATM switch 11, so that the route with the minimum hop counts toward the master device number can be determined as the clock extracting route when the topology update information according to the routing protocol is received.

Also, in this embodiment (4), the master order is not related to the operation of determining the clock extracting route.

Figure 13A:
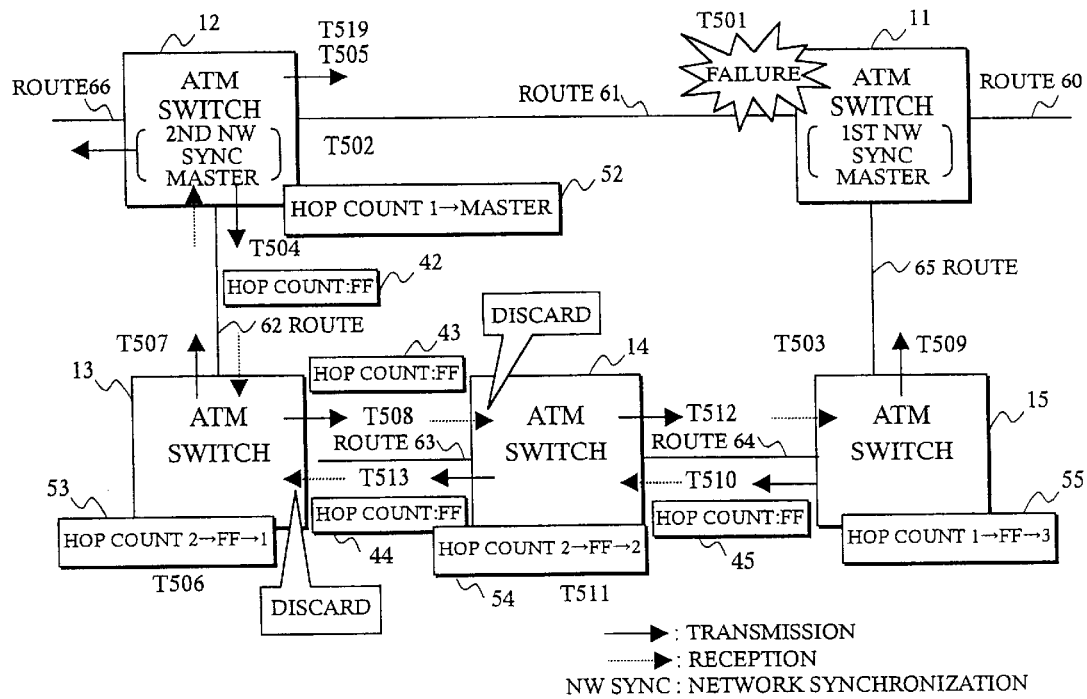
FIGS. 13A and 13B are block diagrams illustrating an embodiment (5) of a network system according to the present invention.
Figure 13B:
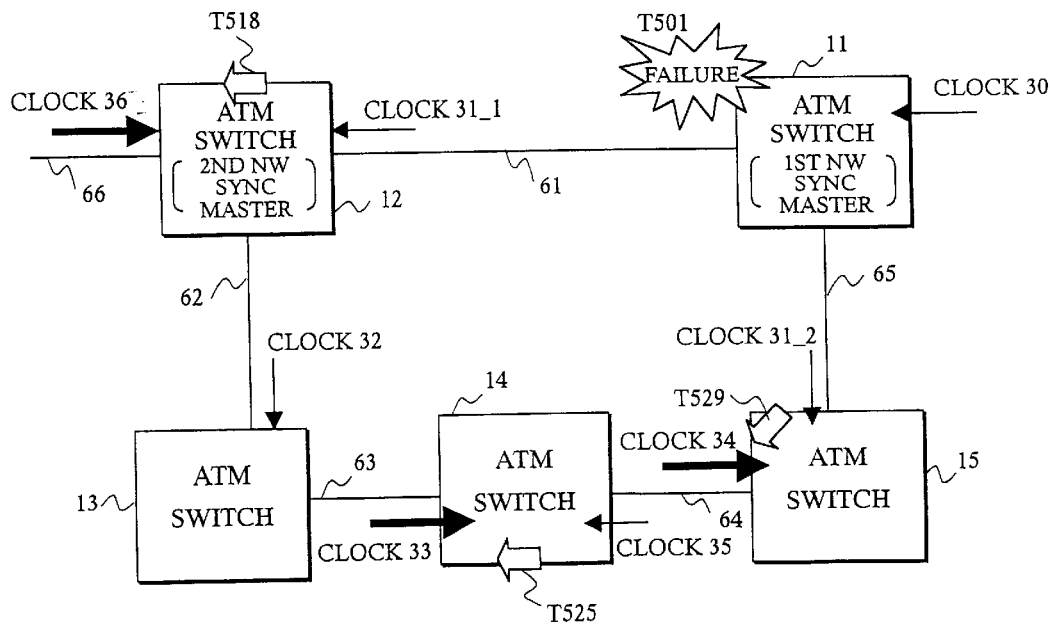

FIG. 13 shows an embodiment (5) of the present invention. The arrangement of the network system of this embodiment (5) is the same as that of the network system of the embodiment (1) shown in FIG. 1. However, it is different from the embodiment (1) in that among the ATM switches 11–15 the network synchronization master ATM switch 11 is set as the first network synchronization master and the ATM switch 12 as the second network synchronization master, and that the ATM switches 11–15 mount thereon the interface of the known routing protocol for periodically exchanging routing information, for example, every 30 seconds and the routing table for holding the routing information.

Also, it is the same as in the embodiment (1) that the network synchronization data and the data of the clock determination table include the "master device number", the "hop count", and the "master order".

Figure 14:
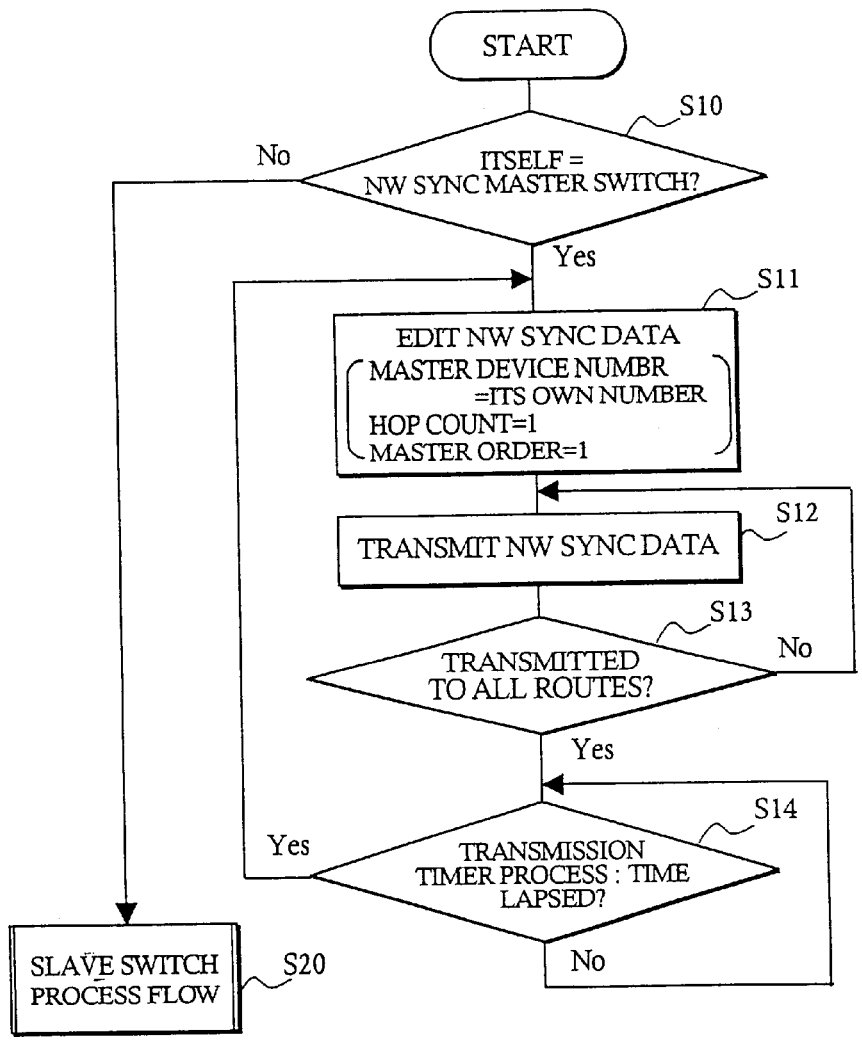
FIG. 14 is a flow chart illustrating a process operation of a first network synchronization master ATM switch in the embodiments (5) and (6) of a network system according to the present invention.
Figure 15:
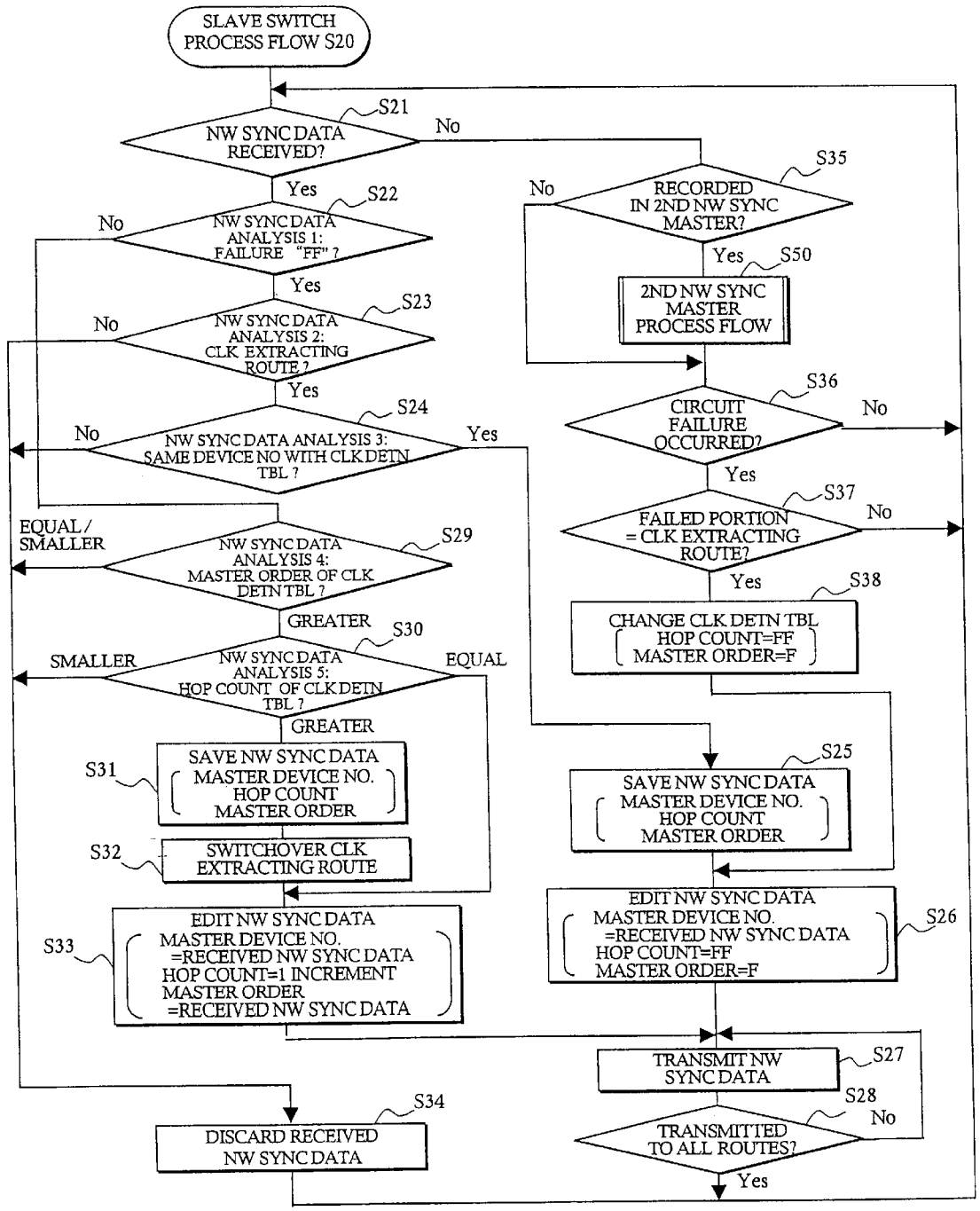
FIG. 15 is a flow chart illustrating a process operation of a slave ATM switch in the embodiments (5) and (6) of a network system according to the present invention.
Figure 16:
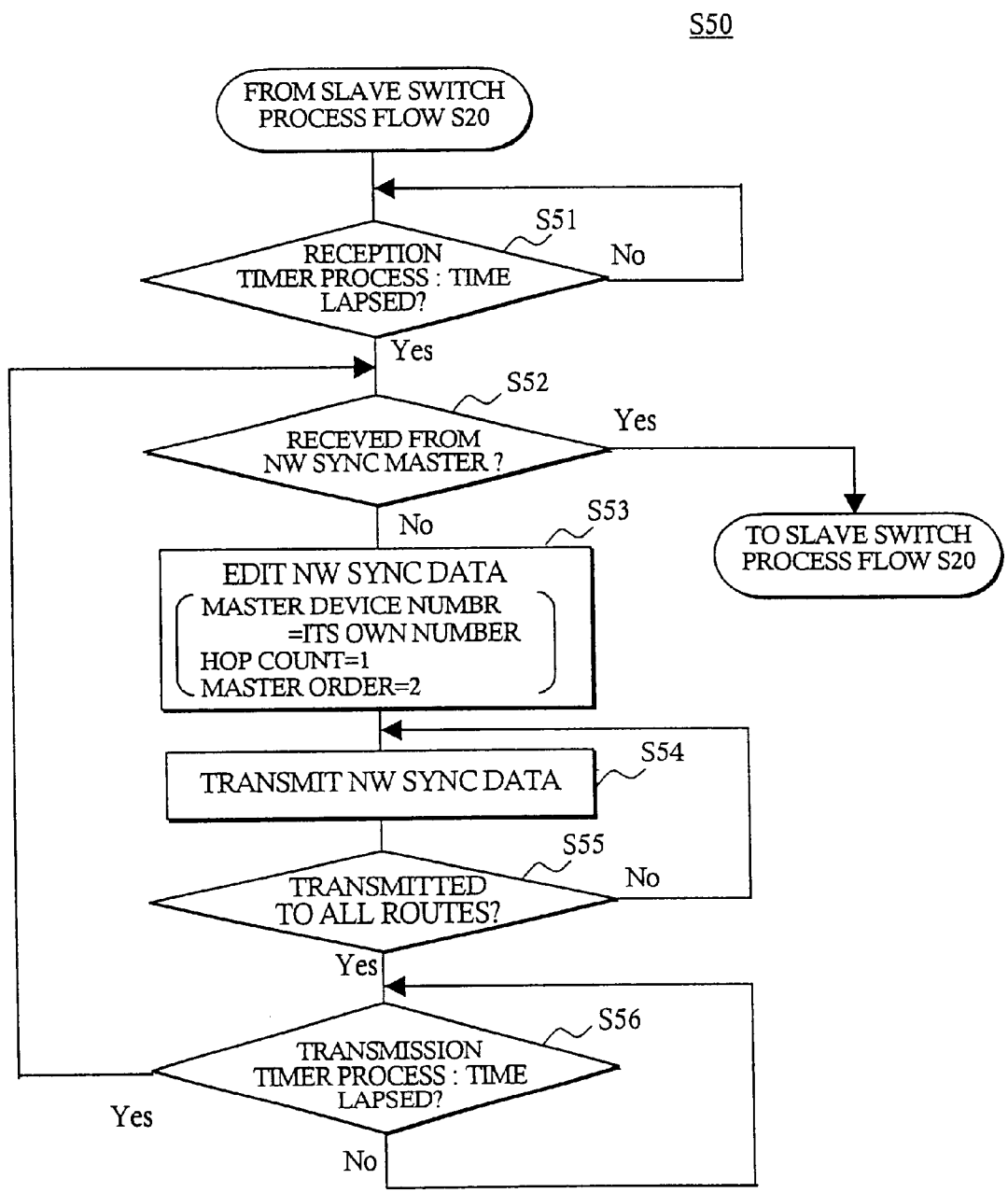
FIG. 16 is a flow chart illustrating a process operation of a second network synchronization master ATM switch in the embodiments (5) and (6) of a network system according to the present invention.

FIGS. 14–16 respectively show process flows of the first network synchronization master ATM switch, the slave ATM switch, and the second network synchronization master.

Based on FIGS. 13 and 14, the operation of the ATM switch 11 of the first network synchronization master will be described herebelow. It is to be noted that steps S10–S14 in FIG. 14 are for the network synchronization master ATM switch 11 to perform transmission operation of the network synchronization data 41 having the initial value set to all of the routes at a predetermined time interval.

Step S10: The ATM switch 11 determines whether or not itself is the (first) network synchronization master switch. The ATM switch 11 recognizes itself as being the network synchronization master so that the operation is shifted to that of the first network synchronization master switch.

Step S11: The ATM switch 11 edits the network synchronization data 41 (not shown in FIG. 13) to be set to the initial values (the master device number=0001(the own device number), the hop count=1, and the master order=1).

Steps S12, S13: The ATM switch 11 transmits the network synchronization data 41 to all of the routes.

Step S14: The ATM switch 11 performs a transmission timer process in which a predetermined time is counted with a timer and returns to step S11 at time-out.

Based on FIGS. 13 and 15, the operation of the slave ATM switch, for example, the ATM switch 15 in FIG. 13 will be described herebelow. It is to be noted that the second network synchronization master ATM 33 switch 12 performs the same operation as the slave ATM switch while the first network synchronization master is operating normally.

Loop of steps S21–S28:

The ATM switch analyzes the network synchronization data when the network synchronization data are received. If the "hop count" of the network synchronization data is "FF" indicating a failure (the network synchronization data analysis 1), the route from which the network synchronization data are received is the clock extracting route (the network synchronization data analysis 2 of step S23), and the master device numbers of the network synchronization data and the clock determination table are the same (the network synchronization data analysis 3), the ATM switch saves the network synchronization data to the clock determination table.

The ATM switch recognizes itself as being not synchronizing with the master clock because of the hop count of the clock determination table being "FF".

Moreover, the ATM switch edits the network synchronization data with the master device number="the master device number of the received network synchronization data", the hop count="FF", and the master order="F" to be transmitted to all of the routes, and returns to step S21.

Thus, the ATM switch notifies that itself is not synchronizing with the master clock.

Loop of steps S21, S22, S23 (or S23, S24), S34

If the route from which the network synchronization data are received is different from the current clock extracting route held in the clock extracting route table, or if the master device numbers of the received network synchronization data and of the clock determination table are different in the network synchronization data analyses 2 and 3, the ATM switch determines that the received network synchronization data are not necessary for determining the clock extracting route, and discards the same to return to step S21.

Loop of steps S21, S22, S29–S33, S27, S28:

The ATM switch performs the data analyses 1, 4, and 5 of the received network synchronization data. If the hop count of the network synchronization data is not equal to "FF" (found by the network synchronization data analysis 1), the "master order" of the clock determination table is larger than that of the network synchronization data (found by the network synchronization data analysis 4), and the "hop count" of the clock determination table is larger than that of the network synchronization data (found by the network synchronization data analysis 5), it means that the route from which the network synchronization data are received has a priority higher than or equal to the current clock extracting route and has the smaller hop count.

Therefore, the ATM switch saves the received network synchronization data to the clock determination table, switches over the clock extracting route to the route from which the network asynchronization data are received, and transmits the network synchronization data edited so that the master device number="the master device number of the received network synchronization data", the hop count="the hop count of the network synchronization data +1", and the master order="the master order of the network synchronization data", to all of the routes to return to step S21.

If the "hop counts" of the network synchronization data and the clock determination table are the same in the network synchronization data analysis 5, the ATM switch transmits the above-mentioned network synchronization data in which the "hop count" is incremented by "1" to all directions without saving the network synchronization data to the clock determination table and without performing the switchover of the clock extracting route, and returns to step S21.

If the "master order" of the clock determination table is smaller than or equal to that of the network synchronization data as found by the network synchronization data analysis 4 of step S29, the ATM switch determines that the clock extracted from the current clock extracting route is the master clock with a higher or equal priority, proceeds to step S34, and discards the received network synchronization data.

If the "hop count" of the clock determination table is smaller than that of the network synchronization data as found by the network synchronization data analysis 5 of step S30, the ATM switch determines that the current clock extracting route has fewer hop counts than the route from which the network synchronization data are received, proceeds to step S34, and discards the received network synchronization data.

Loop of step S21, S35–S38, S26–S28

This loop shows the operation of the ATM switch when the network synchronization data are not received.

Step S35: The ATM switch determines whether or not it is registered as the second network synchronization master, and proceeds to step S36 if not registered.

Steps S36, S37: The ATM switch determines whether or not the circuit failure has occurred. If no failure has occurred, the process returns to step S21 while if a failure has occurred, the ATM switch determines whether or not the failed circuit resides in the clock extracting route by referring to the clock extracting route table 56 (see FIG. 2). If the failed circuit does not reside in the clock extracting route, the process returns to step S21.

If the failed circuit resides in the clock extracting route, the ATM switch operates with a free-running clock of its own and changes the clock determination table to the hop count="FF" and the master order="F" indicating itself as being not synchronizing with the clock of the network synchronization master.

Then, the ATM switch transmits the network synchronization data in which the master device number="the master device number of the current clock determination table", the hop count="FF", and the master order="F" are set (edited), to all of the routes to notify the adjoining ATM switches that the switch itself is not synchronizing with the clock of the network synchronization master.

When itself being registered as the second network synchronization master in step S35, the ATM switch proceeds to the process flow of the second network synchronization master in step S50.

Step S51 of FIG. 16: The ATM switch proceeds to step S52 after the time-out of the receiving timer process for counting time enough for receiving the topology change information from the first network synchronization master ATM switch through the interface of the known routing protocol.

Loop of steps S52–S56: While receiving the topology change information of the first network synchronization master ATM switch through the interface of the routing protocol, the ATM switch determines that no system failure has occurred in the first network synchronization master ATM switch and returns to the process flow of the slave switch in step S20. Namely, the process proceeds to step S36 in FIG. 15.

When the topology update information of the first network synchronization master ATM switch is not received, the ATM switch determines that the system failure has occurred in the first network synchronization master ATM switch, transmits the network synchronization data set to the initial value (the master device number=ex. 0002 (own device number), the hop count="1", and the master order= "2"), to all of the routes, and repeats the same operation by returning to step S52 after a predetermined time elapses to play the role of the network synchronization master.

When the topology update information is received from the first network synchronization master ATM switch, the ATM switch determines that the first network synchronization master ATM switch has recovered from the system failure and returns to the process flow of the slave switch in step S20.

As a result, the second network synchronization master ATM switch operates as the network synchronization master only when the failure has occurred in the first network synchronization master ATM switch.

Figure 17:
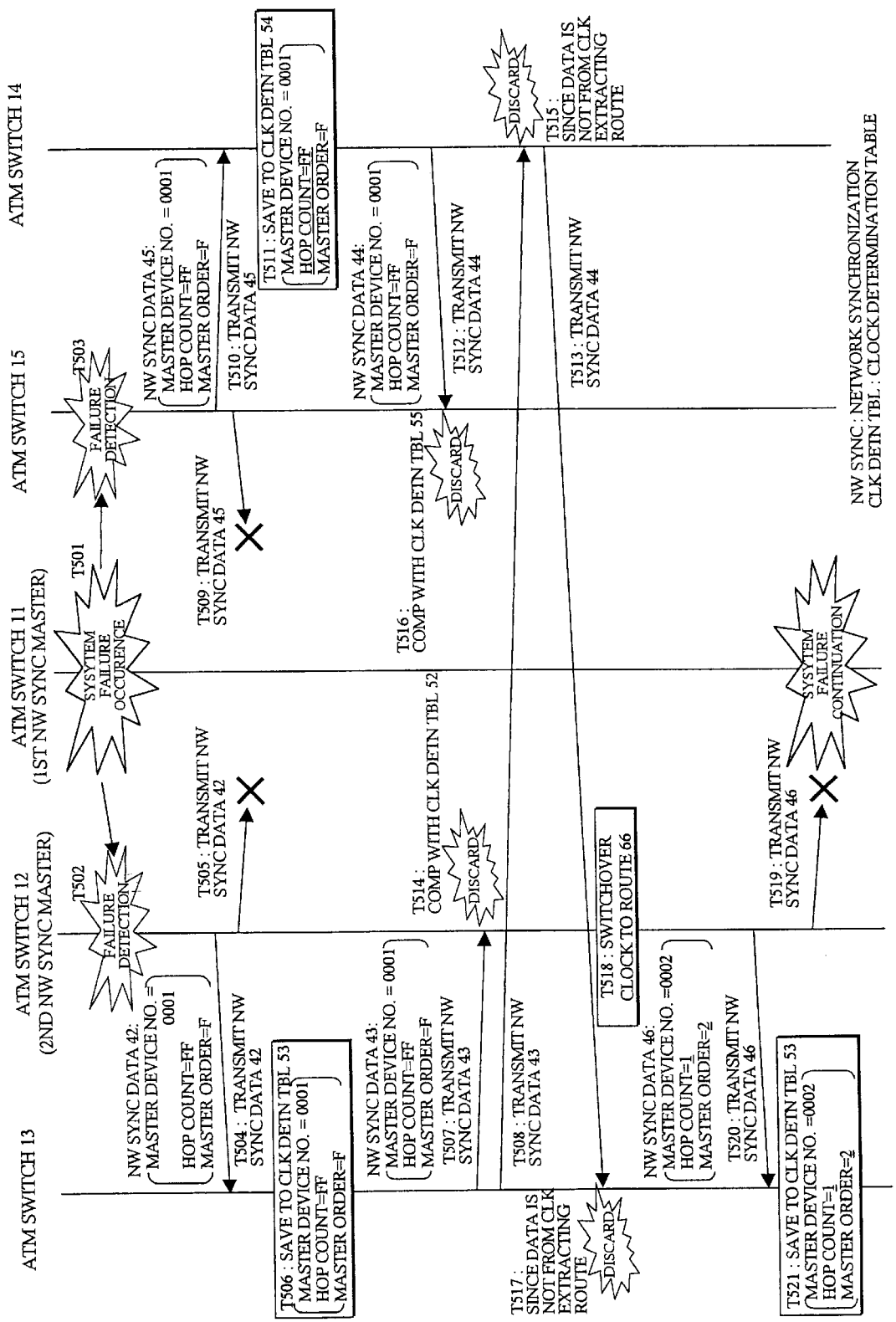
FIG. 17 is a sequence diagram (No. 1) illustrating an example of a hop count determining operation in the embodiment (5) of a network system according to the present invention.
Figure 18:
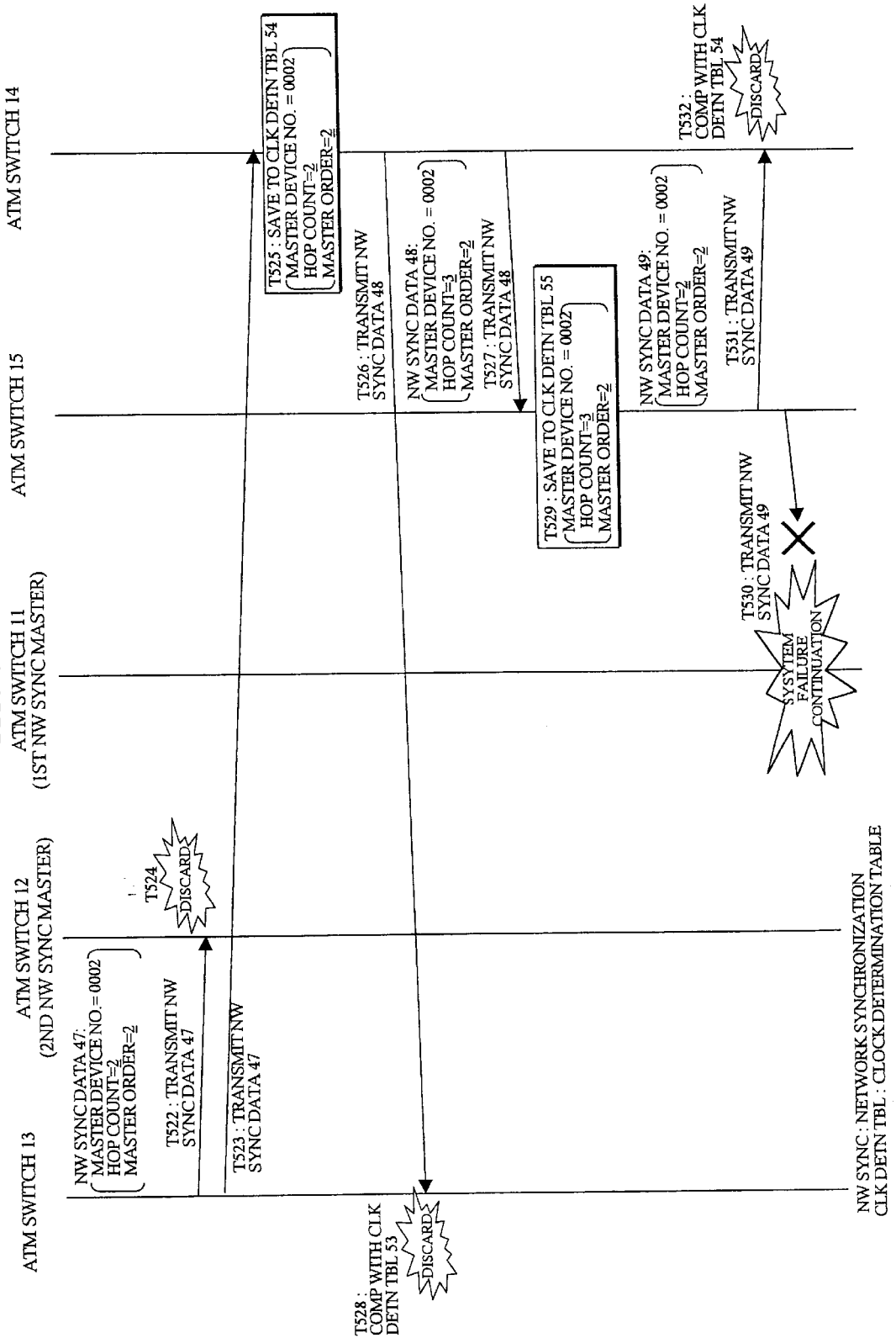
FIG. 18 is a sequence diagram (No. 2) illustrating an example of a hop count determining operation in the embodiment (5) of a network system according to the present invention.

FIGS. 17 and 18 shows the hop count determination sequence (Nos. 1 and 2) of the embodiment (5) of the present invention.

A switchover operation to make the second network synchronization master ATM switch 12 the network synchronization master when a failure occurs in the first network synchronization master ATM switch 11 will be described herebelow referring to FIG. 13–FIG. 16.

It is to be noted that the data of the clock determination tables 52–55 in ATM switches 11–15 in the initial state are supposed to be the same data as in FIG. 1 (and therefore the clock extracting routes are also the same).

Step T501: A system failure occurs in the first network synchronization master ATM switch 11 to cause the system stoppage. The ATM switch 11 stops transmitting the topology update information and network synchronization data transmitted periodically (at step S11–S13 in FIG. 14).

Steps T502, T503: The second network synchronization master ATM switch 12 recognizes that the system failure of the ATM switch 11 has occurred unless the subsequent network synchronization data are received until a predetermined time elapses after receiving the network synchronization data or the topology update information (at steps S35 and S50 of FIG. 15, steps S51 and S52 of FIG. 16).

It is to be noted that the ATM switches 11–15 may be mounted with the interface of the known routing protocol, so that the ATM switch 12 may recognize that system failure of the ATM switch 11 has occurred unless the topology update information of the ATM switch 11 is received until a predetermined time elapses.

Steps T504, T505: The ATM switch 12 transmits the network synchronization data 42 set to the master device number="0001", the hop count="FF", and the master order="F", to the adjoining ATM switches 11 and 13 in order to notify the adjoining ATM switches 11 and 13 that the switch 12 itself is not synchronizing with the clock of the network synchronization master.

Among them, the network synchronization data 42 transmitted to the ATM switch 11 is not received since the failure is occurring in the ATM switch 11 itself.

Steps T506–T508: The ATM switch 13 detects the hop count="FF" of the network synchronization data 42 received from the route 62 from which the clock is extracted and saves the network synchronization data 42 to the clock determination table 53 (at steps S21–S25 in FIG. 15).

Moreover, the ATM switch 13 transmits the network synchronization data 43 having the same data contents as the network synchronization data 42 to the ATM switches 12 and 14, respectively (at steps S26–S28 in FIG. 15).

Steps T509–T510: In the same way as in steps T504 and T505, the ATM switch 15 transmits the network synchronization data 45 set to the master device number="FFFF", the hop count="FF", and the master order="F", to the adjoining ATM switches 11 and 14 to notify that the switch 15 itself is not synchronizing with the master clock. Among them, the network synchronization data 45 transmitted to the ATM switch 11 are not received.

Steps T511–T513: In the same way as in steps T506–T508, the ATM switch 14 saves the network synchronization data 45 to the clock determination table 54 and transmits the network synchronization data 44 having the same contents as the network synchronization data 45 to the ATM switches 15 and 13.

Steps T514, T516: The ATM switches 12 and 15 respectively compare the hop count="FF" of the received network synchronization data 43 and 44 with the hop counts of the clock determination tables 52 and 55, and discards the network synchronization data 43 and 44 since the hop counts of the tables 52 and 55 are smaller (at steps S21, S22, S29, S30, and S34 of FIG. 15).

Steps T515, T517: The ATM switches 14 and 13 respectively discard the network synchronization data 43 and 44 received from the route other than the clock extracting route (at steps S21–S23, and S34 in FIG. 15).

As a result of the foregoing, the ATM switches 12–15 in the network system are to recognize themselves as being not synchronizing with the clock of the network synchronization master.

Steps T518–T520: The second network synchronization master ATM switch 12 determines that the system failure has occurred in the ATM switch 11 because the topology update information of the first network synchronization master is not received before a predetermined time elapses from the time of step T505 (at step S51 in FIG. 16), and switches over the clock extracting route to the route 66 which is preset to do so, when recognizing itself as being the network synchronization master.

Moreover, the ATM switch 12 transmits the network synchronization data 46 (not shown in FIG. 13) set to the initial values (the master device number="0002", the hop count="1", and the master order="2"), to the ATM switches 11 and 13 (at steps S53–S56 in FIG. 16). The network synchronization data 46 transmitted to the ATM switch 11 in which the failure has occurred is not received.

Thereafter, the same operation is repeated as in the network system of the embodiment (1) when the ATM switch 11 is not connected and the ATM switch 12 is made the network synchronization master.

As a result, the master device number, the hop count, the master order, and the clock extracting route making the ATM switch 12 the network synchronization master are set in the clock determination tables and the clock extracting route tables of the ATM switches 13–15.

Steps T521–T532 of FIG. 18 shows the above operation sequence.

Steps T521–T523: The ATM switch 13 respectively compares the hop count="1" and the master order="2" of the received network synchronization data 46 with the hop count="FF" and the master order="F" of the clock determination table 53, and saves the network synchronization data having a smaller hop count and master order to the clock determination table 53 (at steps S21, S22, and S29–S31 in FIG. 15).

Then, the ATM switch 13 having switched over the clock extracting route transmits the network synchronization data 47 in which only the hop count of the network synchronization data 46 is incremented by "1", to the ATM switches 12 and 14 (at steps S32, S33, S27, and S28 in FIG. 15).

It is to be noted that at step T523, the ATM switch 13 is synchronizing with the master clock of the ATM switch 12, and the ATM switch 14 is operating in synchronization with the free-running clock of the ATM switch 15, so that there is a possibility that the clock synchronization is missed between the ATM switches 13 and 14.

Therefore, if the hop count is "FF" (the hop count saved at step T506 before executing step T521) and communication errors frequently occur in the network synchronization data 47 transmitted from the ATM switch 13 to the ATM switch 14, the ATM switch 13 transmits the network synchronization data 47 in synchronization with the clock of the ATM switch 14 for only the communication of the route between the ATM switches 13 and 14.

This enables the communication error of the network synchronization data 47 to be prevented.

This is the same with the above-mentioned step T508.

Step T524: The ATM switch 12 discards the network synchronization data 47, since recognizing itself as being the network synchronization master.

Steps T525–T530: The ATM switch 14 saves the network synchronization data 47 to the clock determination table 54 and transmits the network synchronization data 48 including the hop count=3. The ATM switch 15 saves this network synchronization data 48 and transmits the network synchronization data 49 including the hop count=4 (at steps S21, S22, S29–S33, S27, and S28 in FIG. 15).

The network synchronization data 48 are discarded by the ATM switch 13 and the network synchronization data 49 do not reach ATM switch 11 and are discarded by the ATM switch 14.

Thus, the hop counts of the ATM switches 13, 14, and 15 are set to "1", "2", and "3", respectively, so that each of the ATM switches 13, 14, and 15 extracts the clock of the ATM switch 12 as the master clock through the routes 62, 63, and 64.

Figure 19:
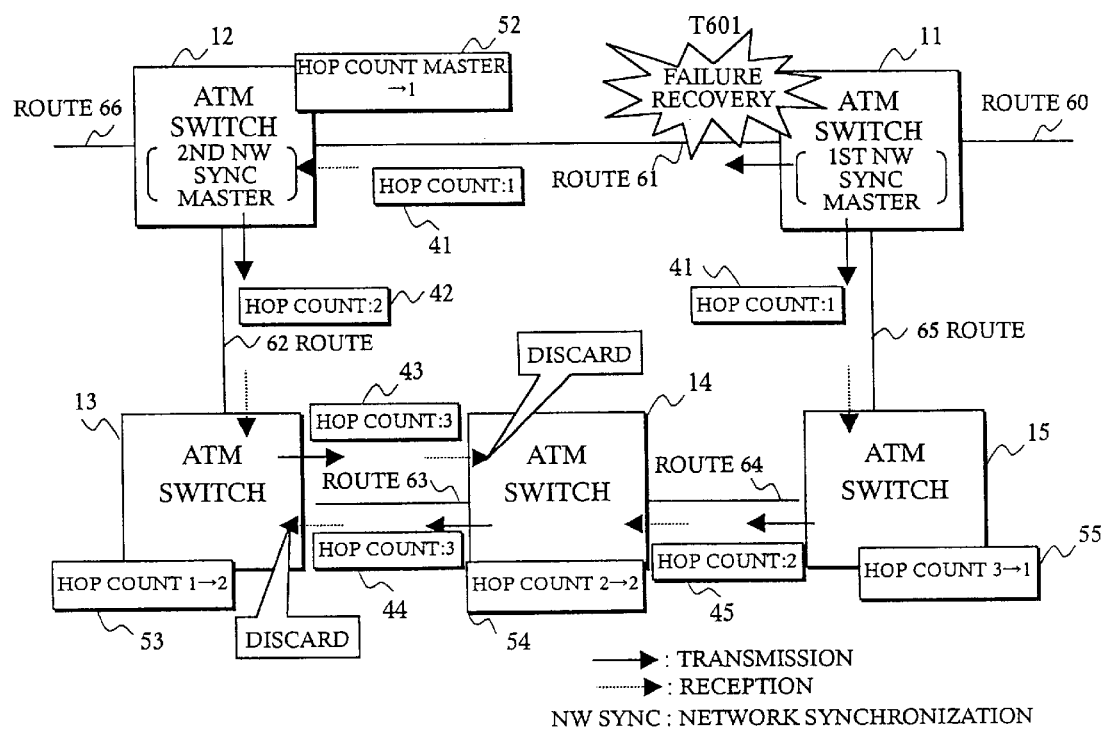
FIG. 19 is a block diagram illustrating the embodiment (6) of a network system according to the present invention.

FIG. 19 shows an embodiment (6) of the present invention. This embodiment (6) shows a case where the first network synchronization master ATM switch 11 in the embodiment (5) has recovered from the failure.

Figure 20:
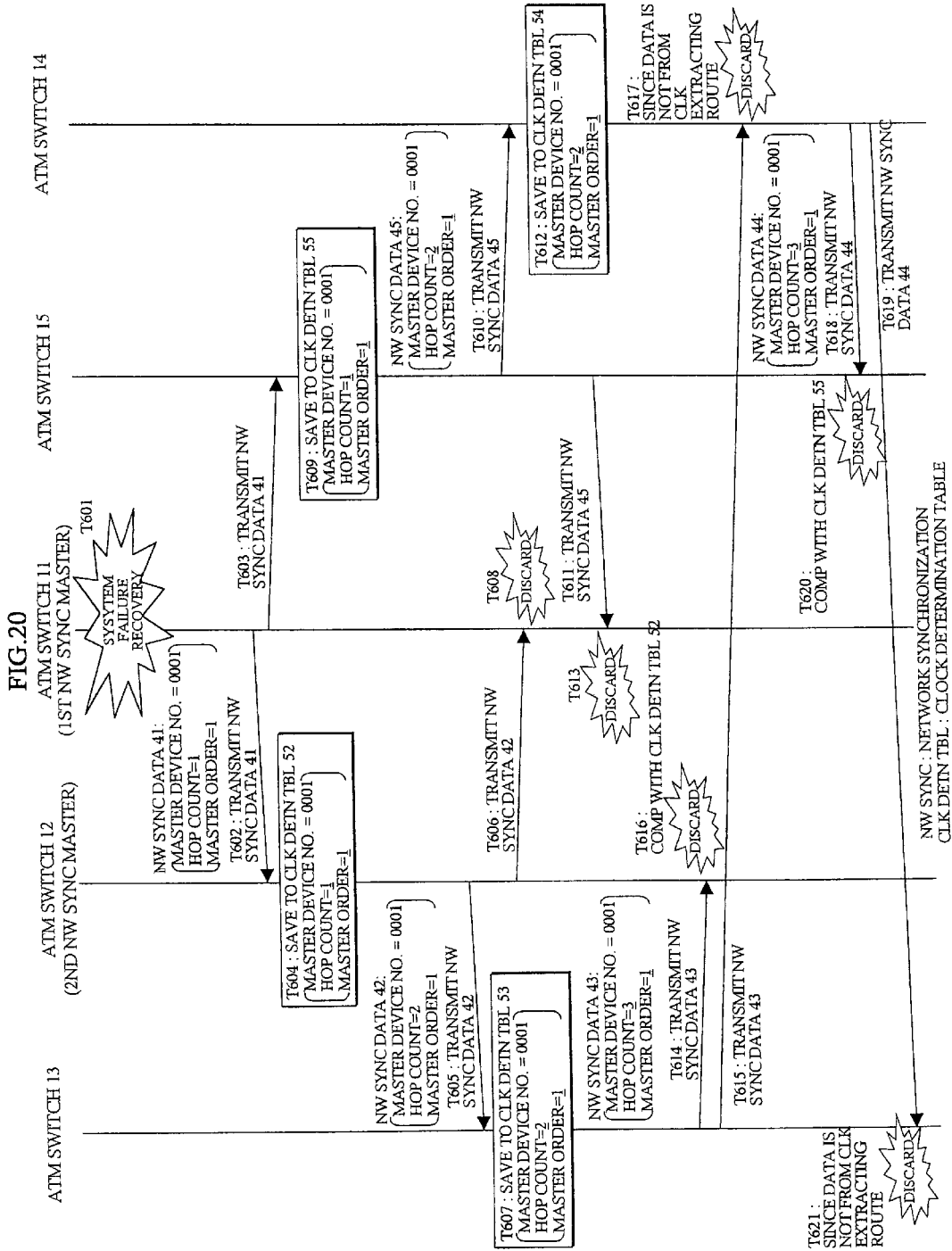
FIG. 20 is a sequence diagram illustrating an example of a hop count determining operation in the embodiment (6) of a network system according to the present invention.
Figure 21:
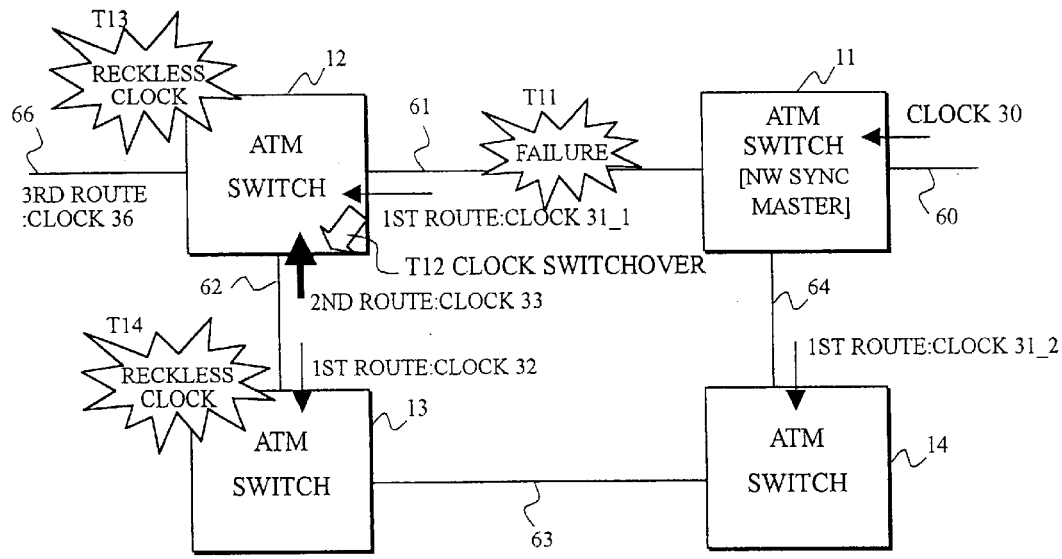
FIG. 21 is a block diagram illustrating an operational example (1) of a prior art network system.
Figure 22:
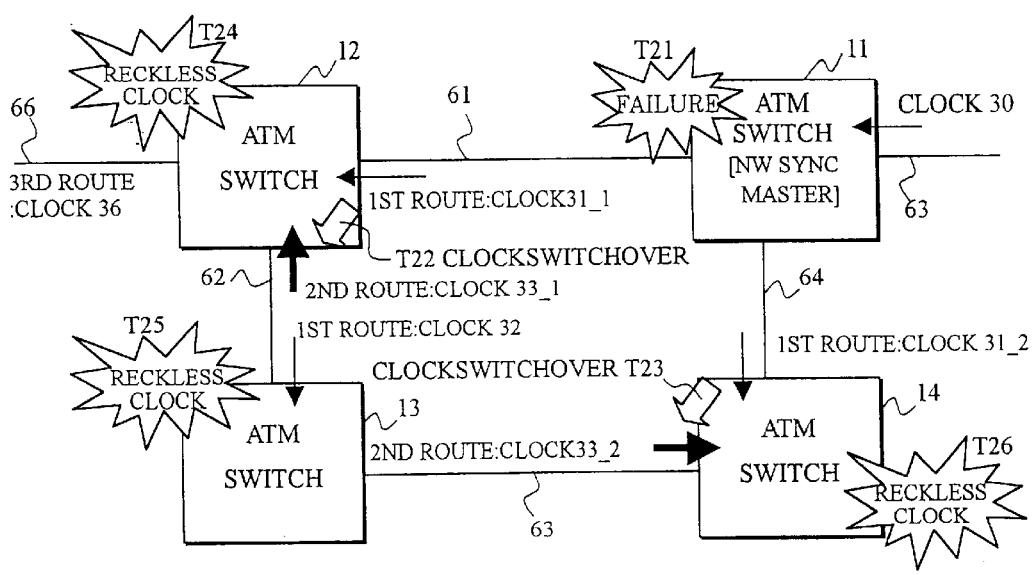
FIG. 22 is a block diagram illustrating an operational example (2) of a prior art network system.

FIG. 20 shows an example of the operation sequence of each ATM switch in the embodiment (6).

This operation sequence will be described herebelow referring to FIGS. 14–16 and 19.

Step T601: When the first network synchronization master ATM switch 11 recovers from the system failure, the ATM switch 11 starts the transmission of the topology update information with the network synchronization data and routing protocol.

The second network synchronization master ATM switch 12 receives the topology update information, recognizes the recovery of the ATM switch 11 from the system failure, stops the transmission of the periodically transmitted network synchronization data 42 (the master device number= 0002, the hop count=1, and the master order=2), and returns to the operation of a general slave ATM switch (at step S52 in FIG. 16, step S50 and S36 in FIG. 15).

Steps T602, T603: The ATM switch 11 starts the periodical transmission of the network synchronization data 41 (the master device number=0001, the hop count=1, and the master order=1) (at steps S10–S14 in FIG. 14).

Steps T604–T621: A sequence operation similar to steps T103–T123 of the embodiment (1) shown in FIG. 4 making the ATM switch 11 the network synchronization master is performed. The data values of the clock determination tables and the clock extracting route tables in the ATM switches 12–15 assume the same data values as the clock determination table and the clock extracting route table in FIG. 4, and the clock extracting routes return to the state of the embodiment (1).

In the above-mentioned embodiments (1)–(6), the network synchronization master ATM switch can recognize itself as being the network synchronization master, and the slave ATM switches can establish the detour of the clock without recognizing the topologies of the network system.

Also, in the embodiments (5) and (6), the slave ATM switch may hold ID information of the first and the second network synchronization master ATM switches, detect the system failure of the first network synchronization master based on the topology update information of the routing protocol, and set the clock determination table, the clock extracting route table, and the network synchronization data to be transmitted.

It is also possible to further improve the reliability of the network system by further providing the third to the n-th network synchronization masters as subnetwork synchronization masters.

This can be easily realized by modifying such as making step S35 in FIG. 15 correspond to the second to the n-th network synchronization masters.

As described above, the network system according to the present invention is arranged such that a master network synchronization device transmits hop count information set to a predetermined initial value; and a slave network synchronization device receives the hop count information from an adjoining network synchronization device, determines a minimum hop count between the device itself and the master network synchronization device based on the hop count information, transmits the minimum hop count as the hop count information, and extracts a clock from the route from which the minimum hop count is received. Therefore, when a failure occurs in the route (circuit) or in the master network synchronization device itself, each network synchronization device systematically selects the clock extracting route without maintenance manual works, thereby enabling the establishment of a network synchronization of the entire network system.

Also, the network system according to the present invention may be arranged such that each of the network synchronization device is provided with the second master network synchronization device besides the first master network synchronization device, the second master network synchronization device detects the system failure based on the stopped receiving of the network synchronization data or on a known routing protocol when the system failure occurs in the first master network synchronization device, and performs its operation as the network synchronization master instead of the first master network synchronization device, whereby it is made possible to establish the network synchronization of the entire network system even if the system failure occurs in the first master network synchronization device.

What we claim is:

1. A network system comprising:
a master network synchronization device, and
a slave network synchronization device,
the master network synchronization device having clock routing means for repeatedly transmitting hop count information set to a predetermined initial value at a predetermined timing, and
the slave network synchronization device having clock routing means for receiving the hop count information from an adjoining network synchronization device and for transmitting a minimum hop count between the slave and the master network synchronization device as the hop count information, a clock determination table for determining the minimum hop count between the slave and the master network synchronization device based on the received hop count information and for saving the minimum hop count and a route from which the minimum hop count is received as a clock extracting route, and a clock extractor for extracting a clock from the clock extracting route.

2. The network system as claimed in claim 1 wherein the slave network synchronization device has a circuit failure detector for detecting a circuit failure, and the clock routing means of the slave network synchronization device transmit failure occurrence information when a circuit failure on the clock extracting route is detected by the circuit failure detector or when the failure occurrence information indicating an occurrence of the circuit failure is received, and the clock determination table saves the failure occurrence information and, upon receiving the hop count information thereafter, updates the hop count information and the route from which the hop count information is received as the minimum hop count and the clock extracting route, respectively.

3. The network system as claimed in claim 1 wherein the clock routing means transmit the hop count information including metrics of the route.

4. The network system as claimed in claim 1 wherein the clock determination table determines the clock extracting route based on a predetermined priority when a plurality of routes having the minimum hop count exist.

5. The network system as claimed in claim 2 wherein the clock routing means of the slave network synchronization device transmit the failure occurrence information as the hop count information, and the clock determination table saves the failure occurrence information as the minimum hop count and changes the failure occurrence information to the hop count information which is the received thereafter.

6. The network system as claimed in claim 1 wherein the clock routing means include an interface installing a routing protocol and a routing table, and the clock determination table determines the minimum hop count and the clock extracting route based on metrics of the routing table.

7. The network system as claimed in claim 2 wherein when the master network synchronization device is made a first master network synchronization device, another network synchronization device is made a second master network synchronization device, and when a system failure occurs in the first master network synchronization device, the second master network synchronization device transmits the hop count information set to a predetermined initial value in place of the first master network synchronization device.

8. The network system as claimed in claim 7 wherein the clock routing means of the second master network synchronization device detect an occurrence of the system failure by unreceiving subsequent hop count information before a predetermined time or more elapses after receiving the hop count information.

9. The network system as claimed in claim 7 wherein each of the network synchronization devices mounts thereon an interface of a routing protocol which manages dynamic topology update information of a network, and the second master network synchronization device recognizes the system failure of the first master network synchronization device with the routing protocol.

10. The network system as claimed in claim 9 wherein the slave network synchronization device recognizes the system failure of the first master network synchronization device with the routing protocol.

11. The network system as claimed in claim 7 wherein upon recognizing the system failure of the first master network synchronization device, the second master network synchronization device establishes a network synchronization with a clock extracted from a clock of a free-running clock generator in the device itself or a clock extracted from a predetermined route connected to a network system other than the network system to which the device itself belongs.

12. The network system as claimed in claim 2 wherein the clock extractor of each slave network synchronization device performs only the communication for a specific route in synchronization with a clock from the specific route when the failure occurrence information is held in the clock determination table and communication errors occur on the specific route to which the hop count information is transmitted at a predetermined number of times or more or at a predetermined time interval or shorter.

13. The network system as claimed in claim 7 wherein the clock extractor of each slave network synchronization device performs only the communication for a specific route in synchronization with a clock from the specific route when the failure occurrence information is held in the clock determination table and communication errors occur on the specific route to which the hop count information is transmitted at a predetermined number of times or more or at a predetermined time interval or shorter.

14. The network system as claimed in claim 7 wherein the second master network synchronization device operates as the slave network synchronization device, and the clock routing means stop transmitting the hop count information set to the initial value upon recognizing that the first master network synchronization device has recovered from the system failure.

15. The network system as claimed in claim 7 wherein the clock routing means of the master network synchronization device transmit a master device number and a master order of the device itself, the clock routing means of the slave network synchronization device relay the master device number and the master order to an adjoining network synchronization device, and the clock determination table determines the minimum hop count based on the hop count information, the master device number, and the master order.

16. The network system as claimed in claim 1 wherein the master network synchronization device is connected to a route which is connected to another network system which is not included in the network system or to another device, and extracts a master clock from the route.

* * * * *